(12) United States Patent
Sari et al.

(10) Patent No.: US 9,790,435 B2
(45) Date of Patent: Oct. 17, 2017

(54) GREEN DIESEL PRODUCTION FROM HYDROTHERMAL CATALYTIC DECARBOXYLATION ON A SUPPORTED PD—CO CATALYST

(71) Applicant: WAYNE STATE UNIVERSITY, Detroit, MI (US)

(72) Inventors: Elvan Sari, Detroit, MI (US); Steven O. Salley, Grosse Pointe Park, MI (US); K. Y. Simon Ng, West Bloomfield, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 0 days.

(21) Appl. No.: 14/744,590

(22) Filed: Jun. 19, 2015

(65) Prior Publication Data

US 2016/0010000 A1 Jan. 14, 2016

Related U.S. Application Data

(60) Provisional application No. 62/015,067, filed on Jun. 20, 2014.

(51) Int. Cl.
| | |
|---|---|
| *C10G 3/00* | (2006.01) |
| *C10L 1/08* | (2006.01) |
| *B01J 23/44* | (2006.01) |
| *B01J 35/10* | (2006.01) |
| *B01J 37/18* | (2006.01) |
| *B01J 21/18* | (2006.01) |

(Continued)

(52) U.S. Cl.
CPC ............... *C10G 3/47* (2013.01); *B01J 21/18* (2013.01); *B01J 23/44* (2013.01); *B01J 23/8913* (2013.01); *B01J 35/002* (2013.01); *B01J 35/006* (2013.01); *B01J 35/1061* (2013.01); *B01J 37/0203* (2013.01); *B01J 37/18* (2013.01); *C10G 3/48* (2013.01); *C10G 3/50* (2013.01); *C10L 1/08* (2013.01); *B01J 29/045* (2013.01); *C10L 2200/0484* (2013.01); *C10L 2270/026* (2013.01); *Y02E 50/13* (2013.01); *Y02P 30/20* (2015.11)

(58) Field of Classification Search
CPC . B01J 21/18; B01J 23/44; B01J 27/244; B01J 35/1061; C10G 3/47; C10G 3/48; Y02P 30/20; C10L 2200/0484
USPC ................................ 502/178, 185, 262, 339
See application file for complete search history.

(56) References Cited

U.S. PATENT DOCUMENTS

| | | | |
|---|---|---|---|
| 4,507,494 A * | 3/1985 | Miyazaki ............... | C07C 69/36 502/170 |
| 6,187,903 B1 | 2/2001 | Elsasser et al. | |

(Continued)

OTHER PUBLICATIONS

"Catalytic Conversion of Brown Grease to Green Diesel via Decarboxylation over Activated Carbon Supported Palladium Catalyst," Elvan Sari et al. Industrial and Engineering Chemistry Research, 2013, 52, pp. 11527-11536.*

(Continued)

*Primary Examiner* — Patricia L Hailey
(74) *Attorney, Agent, or Firm* — Brinks Gilson & Lione

(57) ABSTRACT

Materials and methods for converting brown grease to useful diesel fuel are described. One material is a palladium catalyst on a silicon/carbon support. A method comprises flowing fresh hydrogen over a reaction of diluted brown grease on a palladium/carbon catalyst.

19 Claims, 14 Drawing Sheets

(51) Int. Cl.

| | |
|---|---|
| B01J 23/89 | (2006.01) |
| B01J 35/00 | (2006.01) |
| B01J 37/02 | (2006.01) |
| B01J 29/04 | (2006.01) |

(56) References Cited

U.S. PATENT DOCUMENTS

| | | | |
|---|---|---|---|
| 6,197,720 B1* | 3/2001 | Heineke | B01J 23/44 |
| | | | 502/325 |
| 6,288,295 B1* | 9/2001 | Didillon | B01J 23/40 |
| | | | 502/325 |
| 2007/0010682 A1 | 1/2007 | Myllyoja et al. | |
| 2008/0090721 A1* | 4/2008 | Komoda | H01M 4/92 |
| | | | 502/184 |
| 2010/0113832 A1* | 5/2010 | Ying | B01J 31/1608 |
| | | | 564/473 |
| 2010/0113848 A1 | 5/2010 | Strege et al. | |
| 2012/0028166 A1* | 2/2012 | Morishima | H01M 4/92 |
| | | | 429/487 |
| 2012/0329643 A1* | 12/2012 | Ogawa | B01J 21/063 |
| | | | 502/182 |

OTHER PUBLICATIONS

"A highly active nanocomposite silica-carbon supported palladium catalyst for decarboxylation of free fatty acids for green diesel production: Correlation of activity and catalyst properties," Elvan Sari et al. Applied Catalysis A: General 467 (2013), pp. 261-269.*

"Ordered Mesoporous Pd/Silica-Carbon as a Highly Active Heterogeneous Catalyst for Coupling Reaction of Chlorobenzene in Aqueous Media," Ying Wan et al. J. Am. Chem. Soc. 2009, 131, pp. 4541-4550.*

Knothe, G.; Gerpen, J. V.; Krahl, J. *The Biodiesel Handbook*. AOCS Press: 2005.

Holmgren, J.; Gosling, C.; Marinangeli, R.; Marker, T.; Faraci, G.; Perego, C. New developments in renewable fuels offer more choices. *Hydrocarbon Processing* 2007, 67-71.

PPRC Can Brown Grease be Used for Biodiesel Manufacturing in the Puget Sound? http://www.pprc.org/research/rapidresDocs/BrownGreaseforBio-Diesel.pdf (accessed Jun. 2, 2015).

Canakci, M.; Gerpen, V. J. Biodiesel production from oils and fats with high free fatty acids. *American Society of Agricultural Engineers* 2001, 44, 1429-1436.

Wang, Z. M.; Lee, J. S.; Park, J. Y.; Wu, C. Z.; Yuan, Z. H. Optimization of biodiesel production from trap grease via acid catalysis. *Korean J. Chem. Eng.* 2008, 25, 670-674.

Kim, M.; DiMaggio, C.; Yan, S.; Wang, H.; Salley, S. O.; Ng, K. Y. S. Performance of heterogeneous ZrO2 supported metaloxide catalysts for brown grease esterification and sulfur removal. *Bioresource Technology* 2011, 102, 2380-2386.

Tiwari, R.; Rana, B. S.; Kumar, R.; Verma, D.; Kumar, R.; Joshi, R. K.; Garg, M. O.; Sinha, A. K. Hydrotreating and hydrocracking catalysts for processing of waste soya-oil and refinery-oil mixtures. *Catalysis Communications* 2011, 12, 559-562.

Maki-Arvela, P.; Kubickova, I.; Snare, M.; Eranen, K.; Murzin, D. Y. Catalytic deoxygenation of fatty acids and their derivatives. *Energy & Fuels* 2007, 21, 30-41.

Immer, J. G.; Kelly, M. J.; Lamb, H. H. Catalytic reaction pathways in liquid-phase deoxygenation of C18 free fatty acids. *Applied Catalysis A: General* 2010, 375, 134-139.

Simakova, I.; Simakova, O.; Maki-Arvela, P.; Murzin, D. Y. Decarboxylation of fatty acids over Pd supported on mesoporous carbon. *Catal. Today* 2010, 150, 28-31.

Simakova, I.; Simakova, O.; Maki-Arvela, P.; Simakov, A.; Estrada, M.; Murzin, D. Y. Deoxygenation of palmitic and stearic acid over supported Pd catalysts: effect of metal dispersion. *Applied Catalysis A: General* 2009, 355, 100-108.

Lestari, S.; Maki-Arvela, P.; Eranen, K.; Beltramini, J.; Lu, G. Q. M.; Murzin, D. Y. Diesel-like hydrocarbons from catalytic deoxygenation of stearic acid over supported Pd nanoparticles on SBA-15 catalysts. *Catal Lett* 2010, 134, 250-257.

Lestari, S.; Simakova, I.; Tokarev, A.; Maki-Arvela, P.; Eranen, K.; Murzin, D. Y. Synthesis of biodiesel via deoxygenation of stearic acid over supported Pd/C catalyst. *Catal Lett* 2008, 122, 247-251.

Snare, M.; Kubickova, I.; Maki-Arvela, P.; Eranen, K.; Murzin, D. Y. Heterogeneous catalytic deoxygenation of stearic acid for production of biodiesel. *Ind. Eng. Chem. Res* 2006, 45, 5708-5715.

Maier, W. Hydrogenolysis, IV. Gas phase decarboxylation of carboxylic acids. *Chemische Berichte* 1982, 115, 808-812.

Snare, M.; Kubickova, I.; Maki-Arvela, P.; Chichova, D.; Eranen, K.; Murzin, D. Y. Catalytic deoxygenation of unsaturated renewable feedstocks for production of diesel fuel hydrocarbons. *Fuel* 2008, 87, 933-945.

Bernas, A.; Myllyoj, J.; Salmi, T.; Murzin, D. Y. Kinetics of linoleic acid hydrogenation on Pd/C catalyst. *Applied Catalysis A: General* 2009, 353, 166-180.

Johnson, R. W.; Fritz, E. *Fatty Acids in Industry*. Marcel Dekker, Inc.: New York, 1988; p. 153-175.

Tolvanen, P.; Maki-Arvela, P.; Kumar, N.; Eranen, K.; Sjoholm, R.; Hemming, J.; Holmbom, B.; Salmi, T.; Murzin, D. Y. Thermal and catalytic oligomerisation of fatty acids. *Applied Catalysis A: General* 2007, 330, 1-11.

Simakova, I.; Rozmystowicz, B.; Simakova, O.; Maki-Arvela, P.; Simakov, A.; Murzin, D. Y. Catalytic deoxygenation of C18 fatty acids over mesoporous Pd/C catalyst for synthesis of biofuels. *Top Catal* 2011, 54, 460-466.

Zahedi, G.; Yaghoobi, H. Dynamic modeling and simulation of heavy paraffin dehydrogenation reactor for selective olefin production in linear alkyl benzene production plant. *International Journal of Chemical and Biological Engineering* 2008, 1, 114-119.

Bhasin, M. M.; McCain, J. H.; Vora, B. V.; Imai, T.; Pujado, P. R. Dehydrogenation and oxydehydrogenation of paraffins to olefin. *Applied Catalysis A: General* 2001, 221, 397-419.

Padmavathi, G.; Chaudhuri, K. K.; Rajeshwer, D.; Sreenivasa, R. G.; Krishnamurthyb, K. R.; Trivedic, P. C.; Hathic, K.; Subramanyamc, N. Kinetics of n-dodecane dehydrogenation on promoted platinum catalyst. *Chemical Engineering Science* 2005, 60, 4119-4129.

Kubickova, I.; Snare, M.; Eranen, K.; Maki-Arvela, P.; Murzin, D. Y. Hydrocarbons for diesel fuel via decarboxylation of vegetable oils. *Catalysis Today* 2005, 106, 197-200.

Immer, J. G.; Lamb, H. H. Fed-batch catalytic deoxygenation of free fatty acids. *Energy and Fuels* 2010, 24, 5291-5299.

E.W. Ping, R. Wallace, J. Pierson, T.F. Fuller, C.W. Jones, Microporous and Mesoporous Materials. 132 (2010) 174-180.

E.W. Ping, J. Pierson, R. Wallace, J.T. Miller, T.F. Fuller, C.W. Jones, On the nature of the deactivation o supported palladium nanoparticle catalysts in the decarboxylation of fatty acids, Applied Catalysis A: General. 396 (2011) 85-90.

M. Arend, T. Nonnen, W.F. Hoelderich, J. Fischer, J. Groos,Catalytic deoxygenation of oleic acid in continuous gas flow for the production of diesel-like hydrocarbons, Applied Catalysis A: General. 399 (2011) 198-204.

H. Bernas, K. Eranen, I. Simakova, A.R. Leino, K. Kordas, J. Myllyoja, P. Maki-Arvela, T. Salmi, D.Y. Murzin, Fuel 89 (2010) 2033-2039.

S. Lestari, P. Maki-Arvela, H. Bernas, O. Simakova, R. Sjoholm, J. Beltramini, G.Q.M. Lu, J. Myllyoja, I. Simakova, D.Y. Murzin, Catalytic Deoxygenation of Stearic Acid in a Continuous Reactor over a Mesopourous Carbon-Supported Pd Catalyst, Energy & Fuels. 23 (2009) 3842-3845.

J. Fu, X. Lu, P.E. Savage, Catalytic hydrothermal deoxygenation of palmitic acid, Energy Environ. Sci. 3 (2010) 311-317.

R. Liu, Y. Shi, Y. Wan, Y. Meng, F. Zhang, D. Gu, Z. Chen, B. Tu, D. Zhao, Triconstituent Co-assembly to Ordered Mesostructured Polymer-Silica and Carbon-Silica Nanocomposites and Large-Pore Mesoporous Carbons with High Surface Areas, J. Am. Chem. Soc. 128 (2006) 11652-11662.

Y. Wan, H. Wang, Q. Zhao, M. Klingstedt, O. Terasaki, D. Zhao, Ordered Mesoporous Pd/Silica-Carbon as a Highly Active Heterogenous Catalyst for Coupling Reaction of Chlorobenzene in Aqueous Media, J. Am. Chem. Soc. 131 (2009) 4541-4550.

(56) References Cited

OTHER PUBLICATIONS

M.L. Anderson, R.M. Stroud, D.R. Rolison, Enhancing the Activity of Fuel-cell Reactions by Designing Three-dimensional Nanostructured Architectures: Catalyst-modified Carbon-Silica Composite Aerogels, Nano Lett. 2 (2002) 235.

V.Z. Radkevich, T.L. Senko, K. Wilson, L.M. Grishenko, A.N. Zaderko, V.Y. Diyuk, The influence of surface functionalization of activated carbon on palladium dispersion and catalytic activity in hydrogen oxidation, Applied Catalysis A: General. 335 (2008) 241-251.

B.K. Pradhan, N.K. Sandie, Effect of different oxidizing agent treatments on the surface properties of activated carbons, Carbon. 37 (1999) 1323-1332.

M. Polovina, B. Babi, B. Kaluderovi, A. Dekanski, Surface Characterization of Oxidized Activated Carbon Cloth, Carbon vol. 35 (1997) 1047-1052.

H. Markus, A.J. Plomp, P. Maki-Arvela, J.H. Bitter, D.Y. Murzin, The influence of acidity of carbon nanofiber-supported palladim catalysts in the hydrogenolysis of hydroxymatairesinol, Catalysis Letters. 113 (2007) 141-146.

H. Yang, Y. Yan, Y. Liu, F. Zhang, R. Zhang, Y. Meng, M. Li, S. Xie, B. Tu, D. Zhao, A Simple Melt Impregnation Method to Synthesize Ordered Mesoporous Carbon and Carbon Nanofiber Bundles with Graphitized Structure from Pitches, J. Phys. Chem. B. 108 (2004) 17320-17328.

D.D. Kragten, J.M. Fedeyko, K.R. Sawant, J.D. Rimer, D.G. Vlachos, R.F. Lobo, Structure of the Silica Phase Extracted from Silica/(TPA)OH Solutions Containing Nanoparticles, J. Phys. Chem. B. 107 (2003) 10006-10016.

M. Gurrath, T. Kuretzky, H.P. Boehm, L.B. Okhlopkova, A.S. Lisitsyn, V.A. Likholobov, Palladium catalysts on activated carbon supports Influence of reduction temperature, origin of the support and pretreatments of the carbon surface, Carbon. 38 (2000) 1241-1255.

N. Krishnankutty, M.A. Vannice, The Effect of Pretreatment on Pd/C Catalysts, Journal of Catalysis. 155 (1995) 312-326.

K.S.W. Sing, D.H. Everett, R.A.W. Haul, L. Moscou, R.A. Pierotti, J. Rouquerol, T. Siemieniewska, Reporting Physisorption Data for Gas/Solid Systems with Special Reference to the Determination of Surface Area and Porosity, Pure & Appl. Chem. 57 (1985) 603-619.

L.C. Klein, in: J.L. Vossen, W. Kern (Eds.), Thin Film Processes II, Academic Press, Inc., San Diego, CA, 1991, pp. 501-520.

M.G.M. Van-Der-Vis, E.H.P. Cordfunke, R.J.M. Konings, Jornoul De Physique IV Colloque C3, supplement au Journal de Physique 11.3 (1993) 75.

H.H. Tseng, M.Y. Wey, Effects of acid treatments of activated carbon on its physiochemical structure as a support for copper oxide in DeSO2 reaction catalysts, Chemosphere. 62 (2006) 756-766.

M.L. Toebes, J.A.V. Dillen, K.P.D. Jong, Synthesis of supported palladium catalysts, Journal of Molecular Catalysis A: Chemical. 173 (2001) 75-98.

B.P. Tripathi, V.K. Shahi, Organic-inorganic nanocomposite polymer electrolyte membranes for fuel cell applications, Progress in Polymer Science. 36 (2011) 945-979.

A.M. Seco, M.C. Goncalves, R.M. Almeida, Densification of hybrid silica-titania sol-gel films studied by ellipsometry and FTIR, Materials Science and Engineering. B76 (2000) 193-199.

R.M. Silverstein, F.X. Webster, Spectrometric Identification of Organic Compounds, Sixth ed., John Wiley & Sons, Inc, New York, 1998, pp. 71-143.

P. Vinke, M.V.D. Eijk, M. Verbree, A.F. Voskamp, H.V. Bekkum, Modification of the Surfaces of a Gas-Activated Carbon and a Chemically Activated Carbon With Nitric Acid Hypochlorite, and Ammonia, Carbon vol. 32 (1994) 675-686.

M.S. Solum, R.J. Pugmire, M. Jagtoyen, F. Derbyshire, Evolution of Carbon Structure in Chemically Activated Wood, Carbon vol. 33 (1995) 1247-1254.

A.M. Puziy, O.I. Poddubnaya, A. Martinez-Alonso, F. Suarez-Garcia, J.M.D. Tascon, Synthetic carbons activated with phosphoric acid I. Surface chemistry and ion binding properties, Carbon. 40 (2002) 1493-1505.

J.P.d. Celis, M.S. Villaverde, A.L. Cukierman, N.E. Amadeo, Oxidative Dehydrogenation of Ethylbenzene to Styrene on Activated Carbons Derived From a Native Wood as Catalyst, Latin American Applied Research. 39 (2009) 165-171.

H.-P. Boehm, Functional Groups on the Surfaces of Solids, Angew. Chem. Internat. Edit. 5 (1966) 533-622.

H.H. Lamb, L. Sremaniak, J.L. Whitten, Reaction pathways for butanoic acid decarboxylation on the (111) surface of a Pd nanoparticle, Surface Science. 607 (2013) 130-137.

S.B. Ziemecki, G.A. Jones, D.G. Swartzfager, R.L. Harlow, Formation of Interstitial Pd—C Phase by Interaction of Ethylene, Acetylene, and Carbon Monoxide with Palladiumt, J. Am. Chem. Soc. 107 (1985) 4547.

R. Lamber, N. Jaeger, G. Schulz-Ekloff, Electron Microscopy Study of the Interaction of Ni, Pd and Pt With Carbon, Surf. Sci. 227 (1990) 15-23.

\* cited by examiner

FIG. 12
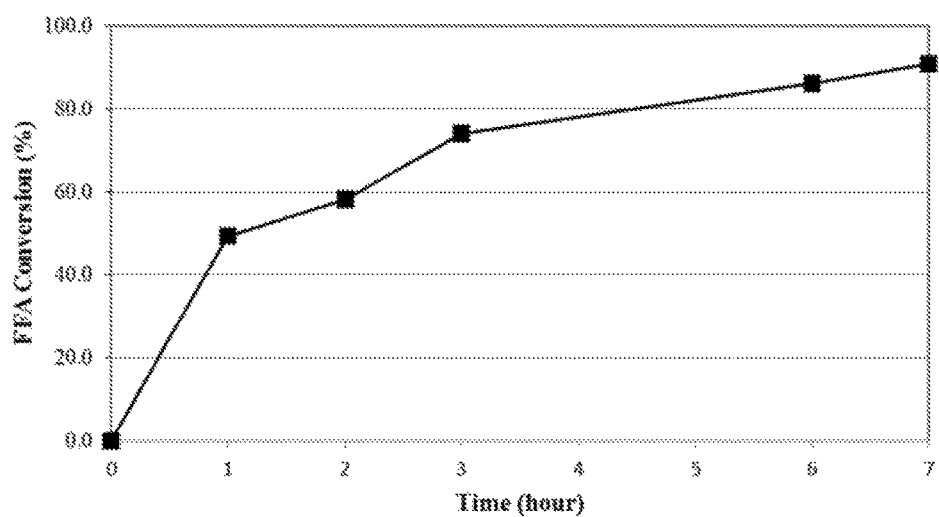
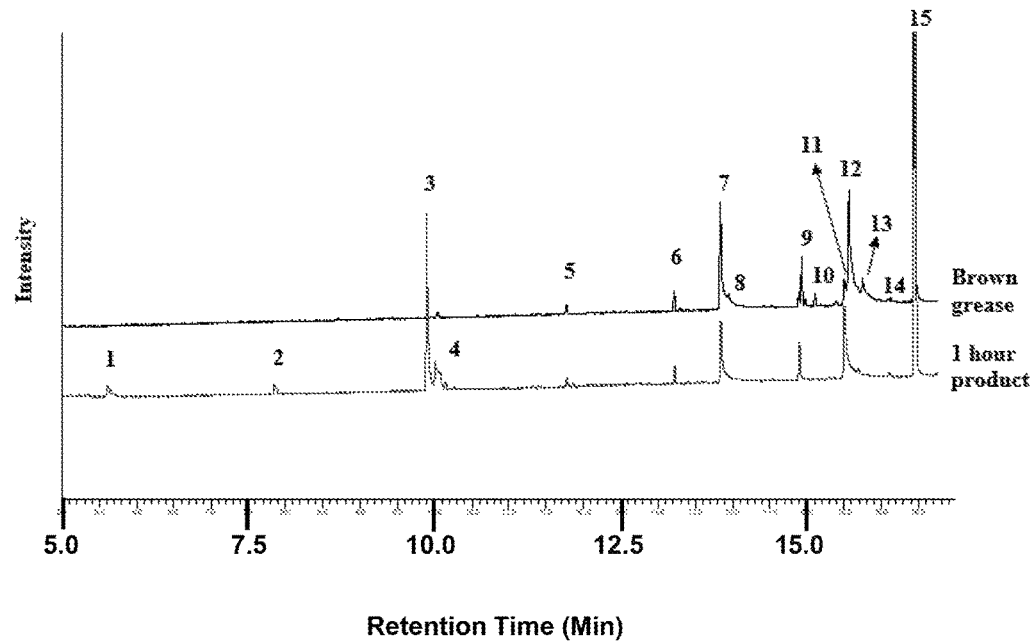

FIG. 12
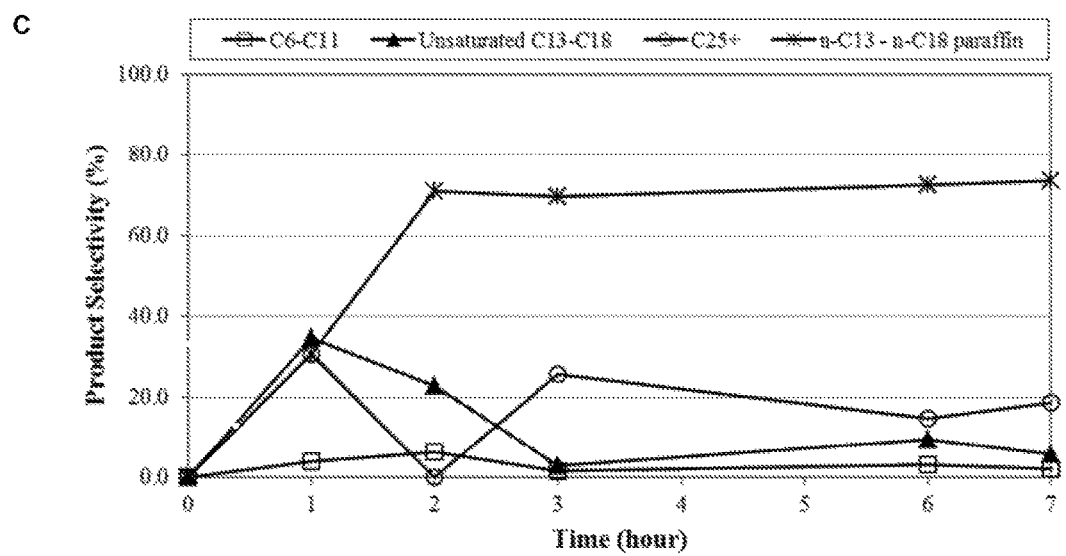
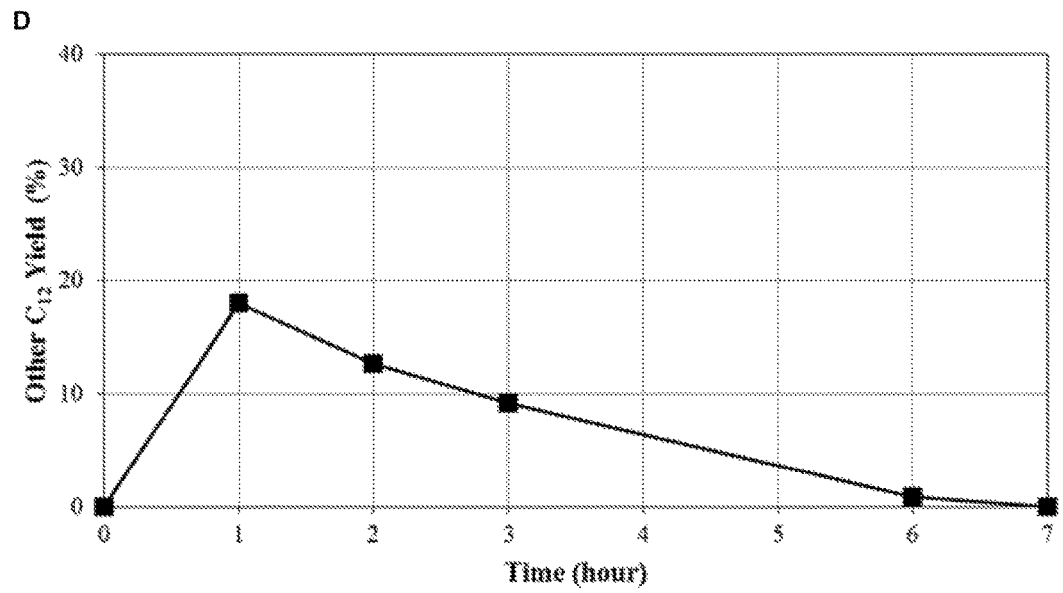

FIG. 15
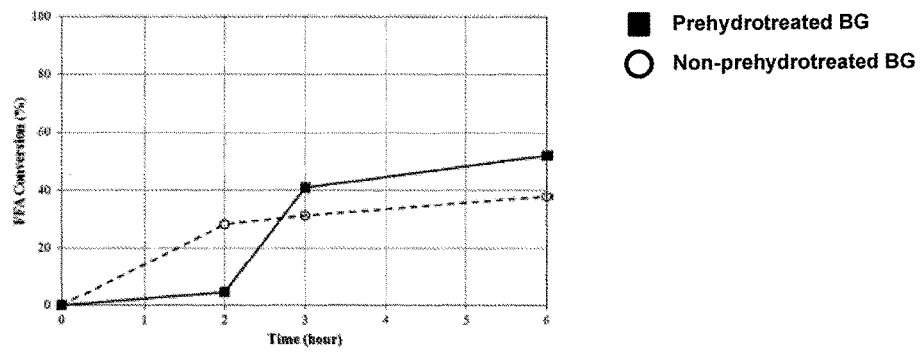
- ■ Prehydrotreated BG
- ○ Non-prehydrotreated BG
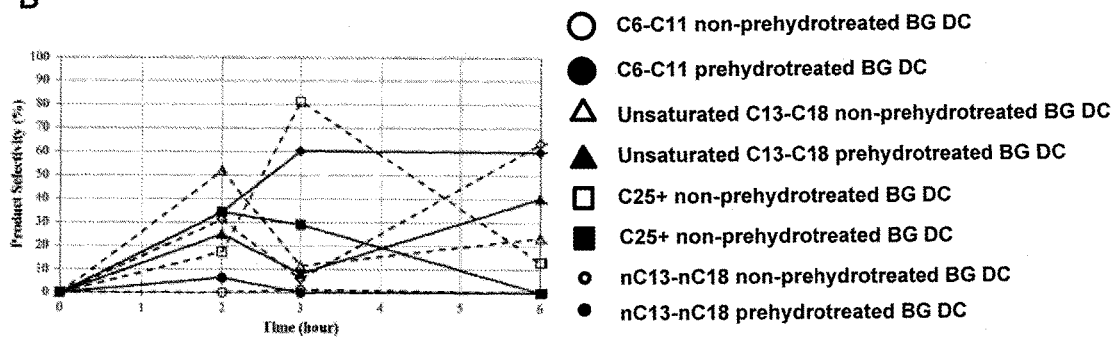
- ○ C6-C11 non-prehydrotreated BG DC
- ● C6-C11 prehydrotreated BG DC
- △ Unsaturated C13-C18 non-prehydrotreated BG DC
- ▲ Unsaturated C13-C18 prehydrotreated BG DC
- □ C25+ non-prehydrotreated BG DC
- ■ C25+ non-prehydrotreated BG DC
- ○ nC13-nC18 non-prehydrotreated BG DC
- ● nC13-nC18 prehydrotreated BG DC FIG. 16
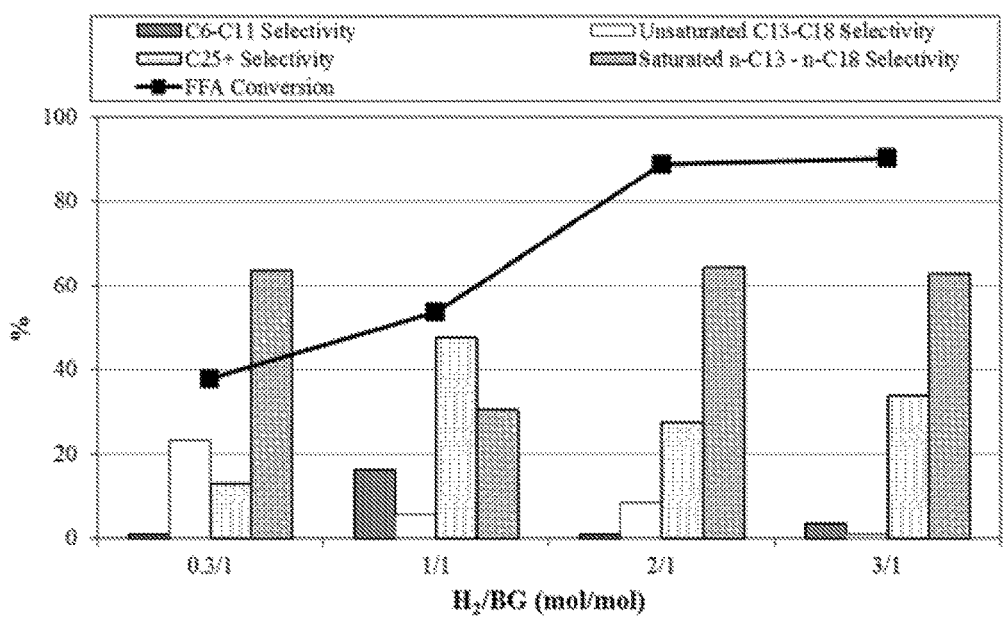
A
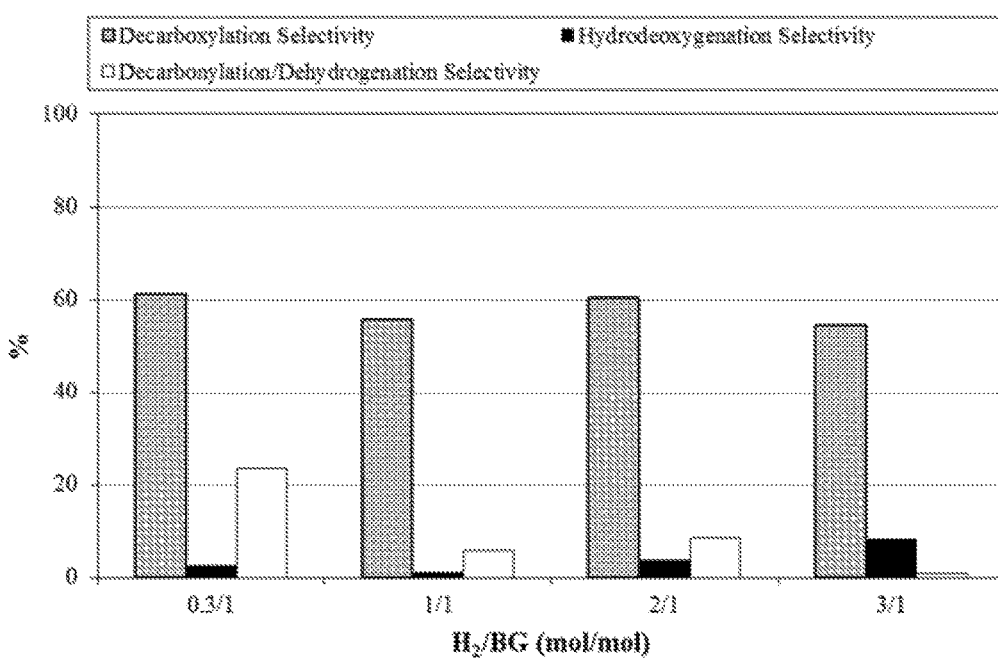
B

GREEN DIESEL PRODUCTION FROM HYDROTHERMAL CATALYTIC DECARBOXYLATION ON A SUPPORTED PD—CO CATALYST

CROSS-REFERENCE TO RELATED APPLICATIONS

This application claims the benefit of U.S. Provisional Application No. 62/015,067, filed on Jun. 20, 2014, entitled "GREEN DIESEL PRODUCTION FROM HYDROTHERMAL CATALYTIC DECARBOXYLATON ON A SUPPORTED Pd—Co CATALYST," the entire contents of which are incorporated herein by reference.

BACKGROUND

The present application generally relates to compositions of matter and methods for converting waste grease to green diesel fuel.

Environmental awareness and projected increases in the world's energy demand have been the motivation for seeking environmentally friendly, renewable alternative fuels. A large amount of waste cooking oil and grease is produced in the U.S. that can be exploited for liquid biofuel generation. In particular, brown grease, which contains mainly free fatty acids (FFAs), can be a potential inexpensive source for a process to obtain straight chain hydrocarbons in the diesel fuel boiling range (green diesel) via catalytic decarboxylation.

Recently, there has been considerable attention on the development of suitable catalysts for decarboxylation of free fatty acids (FFA). Most early studies focused on Pd-based catalysts, which exhibit high activity and selectivity for the formation of straight chain hydrocarbons with one carbon number less than the source FFA. However, these supported palladium catalysts readily deactivate even in the presence of $H_2$. Although a 3 wt % Pd-SBA-15 catalyst is active at 300° C. under 17 bar of 5 vol % $H_2$ in argon for stearic acid decarboxylation for 5 hours, deactivation is reported due to the formation of unsaturated heptadecene product. A 1 wt % Pd supported on a synthetic mesoporous carbon catalyst shows 23% decrease in the BET specific surface area after decarboxylation of palmitic and stearic acids mixture at 300° C. and 17.5 bar $H_2$/Ar. In all cases, the extensive catalyst deactivation may be attributed to catalyst coking. Catalyst deactivation may be related to the amount of unsaturated products which further led to catalyst coking specifically for Ru/C and Rh/C catalysts after 6 hours of stearic acid decarboxylation. On the other hand, the Pd/C catalyst deactivation may be attributed to the reaction atmosphere and degree of unsaturation of the FFA or to catalyst supports.

Deactivation of a mesoporous silica supported palladium catalyst may occur during FFA decarboxylation due to the loss in total surface area, porosity and accessible palladium surface area. Unlike the previously reported literature claim of coke formation, it is claimed that strongly adsorbed reactants and products cause the deactivation. The stability of 5% Pd/C in fatty acid hydrothermal decarboxylation has been investigated and it is reported that the decarboxylation activity of the catalysts is maintained although metal dispersion is significantly reduced after catalyst reuse. The difference in catalytic behavior of the supported metal particles is attributed to the hydrothermal reaction where the catalyst is exposed to sub-critical water.

An ordered mesoporous silica-carbon catalyst support is synthesized as a novel hybrid material. This nanocomposite support has gained increasing attention for catalysis applications in recent years due to several unique features such as high dispersion of palladium nanoparticles (about 3 nm), high surface area, large and tunable pore structure and excellent stability. These silica-carbon nanocomposites are produced on the basis of a triblock copolymer templating approach which is a time consuming catalyst preparation technique.

The nature of the surface functional groups on the activated carbon support when modified by oxidative treatments is found to be a factor in the catalytic activity of precious metals such as palladium. After introducing such oxygen groups, the surface behavior of carbon changes; therefore their catalytic properties differ. The components of activated carbon are disorganized polyaromatic sheets with reactive corner atoms and adsorbent surface atoms. The precursor that is selected for this study, TEOS, is expected to form the templates that contain —OH groups and bridged O atoms in a Si—O—Si structure on the amorphous silica walls, and these groups play a role for the incorporation of silica into activated carbon.

Environmental, economic, and energy security concerns have been the motivation for seeking environmentally friendly, renewable alternative fuels. The major feedstocks for non-ethanol liquid biofuel production are vegetable oils and animal fats. Waste oils, such as used frying oils and brown grease, are lower-cost lipid feedstocks and currently a potential source for economical production-oriented approaches.

From environmental point of view, a life-cycle analysis of different fuel production routes shows that both biodiesel and green diesel products have much lower total environmental impact scores than petroleum diesel. Herein, biodiesel refers to a mixture of fatty acid methyl esters while green diesel refers to a mixture of hydrocarbons in the diesel boiling range that possesses similar fuel properties as petroleum diesel.

There is a tremendous amount of waste cooking oil and grease, collected from restaurant traps, that may be exploited for fuel use. The total volume of trap grease, or brown grease (BG) produced is ~3,800 million pounds per year in the U.S. Disposing of brown grease is a costly process. On the other hand, brown grease is known to possess a high energy value of around 12,000 Btu per pound. Furthermore, brown grease is an inexpensive feedstock in comparison with food grade vegetable oils. The primary cost factor of green diesel is determined as the feedstock costs. It is concluded that soybean oil requires a subsidy in order for the new technology to be competitive with the current crude oil refiners. Therefore, substituting soybean oil feedstock with brown grease would have a significant impact on the economics of green diesel technology. However, the high free fatty acid (FFA) content of brown grease (50-100%) can be problematic for biofuel production and there is no proven biofuel production technology for a feedstock having 50-100% FFA content. The presence of FFA in the feedstock of vegetable oils also creates processing problems. When 10 wt. % FFA-90 wt. % triglycerides are used in a hydrotreating process to produce green diesel, the fraction of high molecular weight hydrocarbons products not in the diesel fuel boiling range gradually increased compared to a feedstock containing only triglycerides. This resulted in a loss of diesel yield and reduction in catalyst life.7

Brown grease is comprised of both saturated and unsaturated FFAs. Almost 40% of brown grease is oleic acid (C18:1), which is a monounsaturated fatty acid, and around 70% is total unsaturated fatty acids. Due to its high FFA content (50-100%), BG is potentially a good candidate for a decarboxylation reaction where the oxygen is removed as carbon dioxide, producing green diesel. Currently, hydrodeoxygenation (HDO) is the only proven technology to convert waste oil into green diesel. However, this technique requires high pressure (~5 MPa) and excess $H_2$ ($H_2$/oil ratio of ~1000/1) in order to remove oxygen as water, leading to high production costs. In comparison, decarboxylation does not require additional $H_2$ to form hydrocarbons. Although several studies of hydrocarbon production from waste oil and vegetable oil (or refinery oil) mixtures have been reported, no selective decarboxylation of brown grease for the production of diesel fuel hydrocarbons has been demonstrated.

Saturated fatty acids have been successfully converted to hydrocarbons via decarboxylation under inert gas. Screening of heterogeneous catalysts for decarboxylation of stearic acid as the model FFA compound has been performed with different metals (Ni, NiMo, Ru, Pd, PdPt, Pt, Ir, Os, Rh) on different supports ($Al_2O_3$, $SiO_2$, $Cr_2O_3$, MgO, C) under a helium inert gas atmosphere. A 5% Pd on activated carbon supported catalyst provided the best conversion of stearic acid to C17 "green diesel like" hydrocarbons (mainly n-heptadecane), with 100% conversion of stearic acid and 99% selectivity to total C17 hydrocarbons. The high decarboxylation activity of 5% Pd/C is attributed to the significantly higher specific surface area of activated carbon than the metal oxide supports and the ability of Pd to form Pd/H complex which acts as a catalytic site for decarboxylation.

There has been considerable study of the conversion of unsaturated FFAs to hydrocarbons. However, there is not yet an active and selective catalyst that can handle direct decarboxylation of unsaturated FFAs to hydrocarbons. The best results demonstrated so far are 99% conversion of oleic acid to stearic acid (selectivity (S)=36%), heptadecane (S=26%) and other side products after 6 hours over Pd/C catalyst under Ar—H2 flow, at 300° C. and 2.7 MPa. Because of the competitive adsorption and reaction of active C=C double bonds on the catalyst surface, the decarboxylation yield of total FFAs decreased while yield of the side reactions increased, leading to an increased $H_2$ consumption and a decreased diesel yield.

During the reaction to convert oleic acid to n-paraffins over 5% Pd/C in the presence of 10% H2 and solvent (dodecane) at 1.5 MPa and 300° C., the primary reactions are hydrogenation of C=C double bonds followed by decarboxylation of the resulting stearic acid. However, in the absence of H2, oleic acid decarboxylation is inhibited by adsorbed cis-C=C double bonds in its alkyl chain.

Increases in petroleum prices, projected increases in the world's energy demand and environmental awareness have shifted research efforts to explore alternative fuel technologies. In particular, green diesel which displays similar properties as petroleum diesel and can be used as a drop-in fuel, has drawn great attention. This second generation liquid biofuel can be obtained from triglycerides and fatty acid containing feedstocks such as vegetable oil, animal fat and waste oil/grease. However, converting waste oil/grease, particularly brown grease which possesses 50-100% fatty acid content, into biofuels is more advantageous because it is a waste, inexpensive and non-food competing feedstock. In the U.S. alone, 3800 million pounds of brown grease is generated every year. There has been considerable attention on the production of green diesel from vegetable oil and fat. Most early studies focused on deoxygenation (selectively decarboxylation) of fatty acids in dodecane solvent over Pd-supported catalysts. These studies demonstrated milder reaction conditions and elimination of hydrogen consumption can be possible compared with the current commercial process (hydrotreating). However, these supported palladium catalysts readily deactivate due to the formation of unsaturated heptadecene product leading to catalyst coking, the high unsaturation level of the fatty acids, lack of hydrogen in the reaction atmosphere, decrease in the BET specific surface area, loss in porosity and accessible palladium surface area.

Recently, studies of fatty acid deoxygenation have been conducted in aqueous media under sub- and super-critical water conditions. The advantage of water as the reaction media is not only the use of an environmentally benign solvent in the process but also the avoidance of a water removal step after biomass conversion or triglyceride hydrolysis that generates fatty acids in an aqueous stream. It is shown that both Pd/C and Pt/C catalysts are active for a saturated fatty acid (palmitic acid) decarboxylation with 76% molar yield to pentadecane in subcritical water at 370° C. However, Pt metal dispersion exhibited a significant reduction (from 38.9% to 0.8%) after the reaction. Activated carbon itself can catalyze both saturated and unsaturated fatty acids to produce hydrocarbons in sub- and super-critical water as an alternative to the expensive noble metal catalyst. However, the major product from oleic acid conversion is stearic acid with 24% molar yield while the decarboxylation product yield is only 6% after 3 hours reaction at 370° C.

Pd/C catalyst behaves differently in sub-critical water than in organic solvent for fatty acid decarboxylation.

A decarboxylation study of acetic acid, one of the simplest carboxylic acid, conducted on $ZrO_2$ in super-critical water at 400° C., shows that $ZrO_2$ is an active catalyst for $CO_2$ removal from acetic acid, however, it selectively produces acetone (ketone). Moreover, a structure change of the zirconia catalyst is observed during acetic acid conversion in super-critical water. The conversion of stearic acid in the presence of oxide catalysts ($CeO_2$, $Y_2O_3$ and $ZrO_2$) is reported as 30%, 62% and 68%, respectively in super-critical water at 400° C. in 30 minutes. Similar to the acetic acid hydrothermal reaction, stearic acid reaction produced ketone ($C_{17}H_{35}OCH_3$) in addition to hydrocarbons. Structure change of another oxide catalyst is also observed in a solvent free oleic acid decarboxylation reaction in an investigation of the decarboxylation activity of hydrotalcites catalysts with various $MgO/Al_2O_3$ ratios in a solvent free atmosphere, that a MgO loading of more than 63% and reaction temperature of 350° C. is needed to obtain deoxygenated hydrocarbon products selectively and with oleic acid conversion more than 98% in 3 hours. More importantly, there is no significant change of the MgO structure in the hydrotalcite catalyst.

Stearic acid thermal decomposition is observed with 50% conversion at 400° C. under Ar atmosphere in 30 minutes while its hydrothermal conversion is 2% in super-critical water under the same reaction conditions. Stearic acid conversion is enhanced by adding NaOH or KOH in super-critical water.

Degree of fatty acid unsaturation on the decarboxylation over Pt/C catalyst in sub-critical water at 330° C. is that unsaturated fatty acids possess much lower heptadecane yield and selectivity than saturated fatty acids (molar yield of more than 80% to heptadecane from stearic acid vs. less than 20% from oleic acid) in 2.5 hours reaction. Because Pt/C catalyst is found to be more active and selective for decarboxylation of palmitic (a saturated) acid compared to Pd/C in sub-critical water, oleic acid decarboxylation over Pt/C catalyst is investigated. However, saturated and unsaturated fatty acids behave differently under hydrothermal reaction conditions.

Conversion of waste oil/grease which mainly contains unsaturated fatty acids may be predicted by investigation of oleic acid (the major component of waste oil) conversion on Pd metal supported catalyst. In order to design a suitable catalyst for conversion of brown grease to green diesel, a systematic study of the model compounds is necessary to understand the reaction pathways in super-critical water. Therefore, the decarboxylation reaction of oleic acid is investigated on various catalysts in super-critical water with the aim of producing hydrocarbons in the diesel range in the absence of $H_2$ and to improve the catalytic decarboxylation activity and selectivity of the carbon supported catalyst.

There is a need to investigate the effect of reaction parameters on the activity and the selectivity of brown grease decarboxylation with minimum $H_2$ consumption over an activated carbon supported palladium catalyst, and to gain a better understanding of the reaction pathways.

In the present work, a new, well-defined and highly efficient Pd/Si—C catalyst is developed for the decarboxylation of FFA. This new nanostructured hybrid catalyst has a well-defined mesoporous structure which allows a better understanding of structure-activity characteristics that are crucial in elucidating the FFA decarboxylation mechanism, unlike an activated carbon supported palladium catalyst. The decarboxylation reaction of oleic acid is investigated over these catalysts with the aim of producing green diesel in the absence of additional H2 under mild reaction conditions, elucidating the effects of the nature of the functional groups on the activity and developing a procedure to maintain high catalytic activity. For all these reasons, there is a need for catalytic processes for the conversion of unwanted brown grease into valuable products such as biofuels.

SUMMARY

In one aspect, the present disclosure provides a catalyst for decarboxylation of a fatty acid, the catalyst comprising about 0.5% to about 10% palladium by weight and a support comprising silicon atoms and carbon atoms.

In another aspect, the present disclosure provides a method of making a catalyst for decarboxylation of a fatty acid comprising a first step of combining activated carbon with tetraethyl orthosilicate to form a support, a second step of mixing a palladium solution with the support, and a third step of drying the catalyst.

In a further aspect, the present disclosure provides a method of converting brown grease to green diesel, the method comprising a first step of diluting brown grease with a diluent, a second step of combining brown grease with a catalyst comprising palladium and carbon in a reactor having a gas flow intake and a gas relief valve, and a third step of providing a volume of gas comprising hydrogen gas through the gas flow intake and allowing gas to exhaust through the gas relief valve to maintain a pressure of about 1.5 megapascal.

Further objects, features and advantages of this system will become readily apparent to persons skilled in the art after a review of the following description, with reference to the drawings and claims that are appended to and form a part of this specification.

BRIEF DESCRIPTION OF THE DRAWINGS

FIG. 12 shows brown grease (BG) decarboxylation over 5% Pd/C catalyst at 300° C. and 1.5 MPa in the semi-batch reaction mode for 7 hours. Reaction conditions: BG=7 wt. % in dodecane, solvent/catalyst=65/1 (wt./wt.), heating rate=5° C./min, 60 ml/min gas flow, 10 vol. % H2-90 vol. % Ar. (a) Conversion of brown grease free fatty acids (FFAs) to hydrocarbons (HCs); (b) GC-FID chromatogram of the product at 1 hour. Peaks: 1. n-tridecane, 2. n-pentadecane, 3. n-heptadecane, 4. other C17 hydrocarbons, 5&6. unidentified brown grease compound, 7. palmitic acid 8. palmitoleic acid, 9&10. unidentified brown grease compound, 11. stearic acid, 12. oleic acid, 13. linoleic acids, 14. linolenoic acid, 15. ISTD; (c) Liquid product selectivities; (d) Other C12 Yield from solvent;

FIG. 15 shows the effect of pre-hydrotreating BG on (a) FFAs conversions; (b) Liquid product selectivities. Reaction conditions: 5% Pd/C catalyst, BG concentration in solvent=6 wt. %, catalyst/solvent=66/1 (wt./wt.), 300° C., 1.5 MPa, 10 vol. % $H_2$-90 vol. % Ar, 6 hours batch reaction;

FIG. 16 shows the effect of H2/BG ratio on (a) Liquid product selectivities and FFAs conversions; (b) Decarboxylation and hydrodeoxygenation (HDO) selectivities. Reaction conditions: BG=6 wt. % in dodecane, solvent/catalyst=66/1 (wt./wt.), 6 hr batch reaction at 300° C. and 1.5 MPa over 5% Pd/C catalyst.

DETAILED DESCRIPTION

Figure 1:
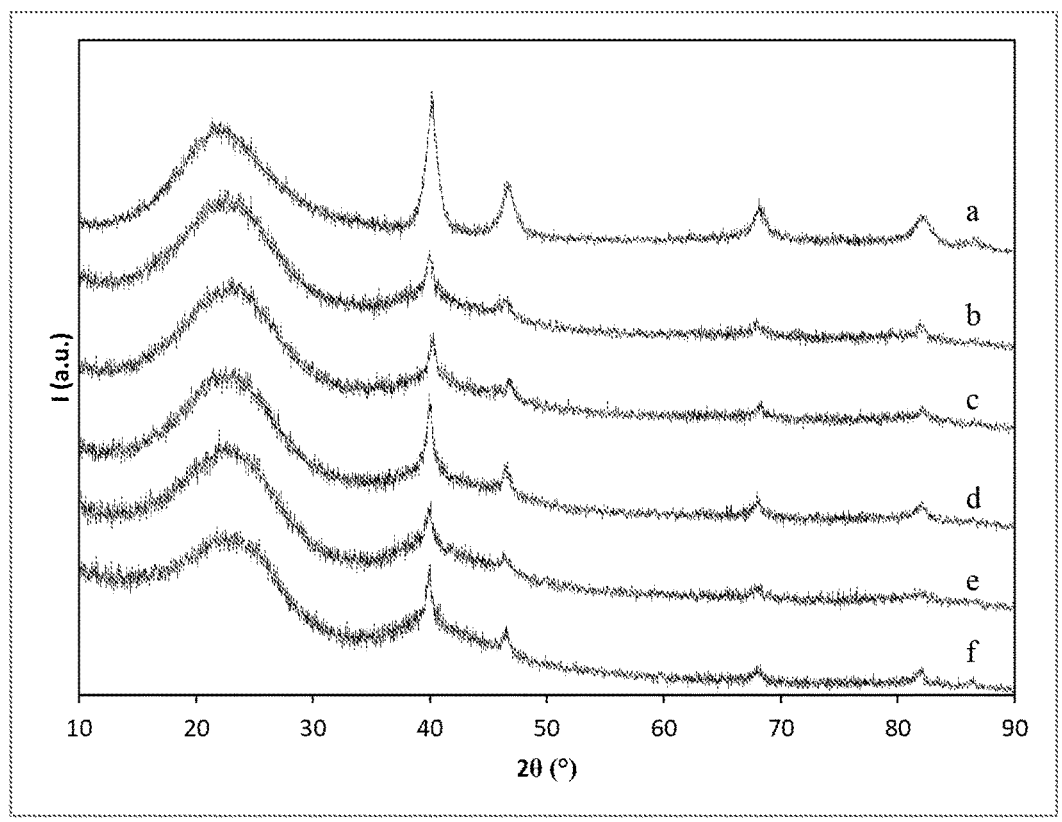
FIG. 1 is wide-angle XRD patterns of fresh palladium catalysts supported on: A: silica, B: SiC (4:1), C: SiC (2:1), D: SiC (1:1), E: SiC (0.5:1), and F: activated carbon.

The terms "substantially" or "about" used herein with reference to a quantity includes variations in the recited quantity that are equivalent to the quantity recited, such as an amount that is equivalent to the quantity recited for an intended purpose or function. "Substantially" or derivatives thereof will be understood to mean significantly or in large part.

A class of Pd catalyst supported on a silica-activated carbon nanocomposite for free fatty acid (FFA) decarboxylation is developed, and displayed excellent activity and operation stability selectively for the green diesel hydrocarbons formation in the absence of $H_2$ under mild reaction conditions. Six catalysts containing 5 wt % Pd are prepared by systematically varying the silica content in the support. In addition to the effect of particle size, the impact of catalyst preparation method on the activity and selectivity is elucidated. A 5 wt % Pd/Si—C-4 catalyst maintained stable activity for 16 days under reaction conditions of 1.5 MPa and 300° C. Although a continuous supply of $H_2$ is not necessary, $H_2$ treatment is essential to restore the catalytic activity and the desired product selectivity. Characterization of the catalyst revealed that the highly active Pd/Si—C-4 catalyst has easily accessible and well-distributed metallic Pd nanoparticles inside the hybrid mesopores.

The decarboxylation of brown grease (BG) to green diesel hydrocarbons over a 5 wt. % Pd/C catalyst is investigated in semi-batch and batch reactors. Catalytic deoxygenation of BG under $H_2$—Ar occurs primarily via decarboxylation with the liquid products of primarily n-heptadecane and n-pentadecane. A 90% conversion of BG in a semi-batch mode is obtained in 7 hours. In contrast, in a batch reaction the conversion is roughly 40% in the same reaction time. However, by pre-treating the "as received" BG with $H_2$, the conversion in a batch reactor is increased 1.4-fold; and when the $H_2$ to BG ratio is increased to 3/1 (mol/mol), the conversion is further improved. A complete conversion of BG into green diesel via decarboxylation is possible over 5% Pd/C catalyst at 300° C. and 1.5 MPa. This study demonstrates the feasibility of obtaining valuable green diesel biofuel from waste oil.

The following chemicals are used in this investigation: a commercial activated carbon (Charcoal Norit, Sigma-Aldrich), tetraethyl orthosilicate (TEOS, 99.999%, Sigma-Aldrich), palladium(II) chloride ($PdCl_2$, ≥99.9%, Sigma-Aldrich), oleic acid (technical grade 90%, Sigma-Aldrich, St. Louis, Mo.), dodecane (anhydrous, ≥99%, Sigma-Aldrich), carbon disulfide (HPLC grade ≥99.9%, Sigma-Aldrich), methyl arachidate (>99%, Nu-Chek Prep Inc., Elysian, Minn.), Ultra high purity grade argon (Ar), hydrogen (H2) and nitrogen (N2) are purchased from Cryogenic Gases (Detroit, Mich.).

Catalyst preparation: activated carbon (AC) is immersed in liquid TEOS with varying mass ratios of TEOS to AC. The mixture is stirred vigorously for 2 hours at 120° C. Then, it is dried at 105° C. for 18 hours. Prepared supports are designated as Si-AC-x where x represents the mass ratio of TEOS to AC. During the preparation of Si-AC-0.5 and Si-AC-1, ethanol is added to provide necessary wetness of AC. For comparison, only activated carbon and only silica supported catalysts are also prepared. A support containing only silica is prepared by calcination of the Si-AC-3 support at 550° C. for 5 hours in air to remove activated carbon. In order to obtain 5 wt % Pd on the support, about 1.1 wt % $PdCl_2$ solution is mixed with the support ($PdCl_2$/support=0.088 wt/wt) at room temperature for 24 hours. After each catalyst is dried at 100° C. for 5 hours, the reduction is carried out under a flow of 10 vol % $H_2$-90 vol % $N_2$ at 200° C. for 3 hours.

Material characterization: powder X-ray diffraction (XRD) patterns are obtained on a Rigaku MiniFlex 600 at a scan rate of 3°/min (40 kV, 15 mA). The Scherrer equation and Bragg's law are used to calculate the mean metal particle size and the lattice parameter, respectively.

A Brunauer-Emmett-Teller (BET) analysis is carried out using a Micromeritics TriStar II 3020 (V1.03) surface area analyzer. The samples are degassed in vacuum (P) at 200° C. for 6 hours prior to analysis. The adsorption/desorption isotherms are acquired at 87.30 K in the relative pressure range of 0.01 to 0.99. The Barrett-Joyner-Halenda (BJH) model is used to derive the pore volumes, average pore diameters and pore size distributions from the desorption branches of the isotherms. A t-Plot is used to calculate the micropore surface areas and micropore volumes.

Catalyst acidity is determined with a Brinkmann/Metrohm 809 Titrando (Westbury, N.Y.) potentiometric titrator. An acid-base technique is performed to determine the total acid number of surface groups reacted in the catalyst slurry of 0.1 g catalyst and 75 mL titration solvent including a mixture of water, propan-2-ol and toluene. A solution containing 0.1 N KOH is used as titrant. The amount of titrant consumed to reach a potentiometric end point (EP) is used to calculate the amount of acidic groups.

Transmission electron microscopy (TEM) is conducted using a JEM-2010 microscope operating at 200 kV. The catalysts that are suspended in ethanol are placed on a carbon coated copper grid.

Fourier transform infrared (FTIR) spectra of powder catalysts are collected on a Spectra 400 spectrometer (Perkin-Elmer, Shelton, Conn.). Four scans are used to establish an acceptable signal to noise level for each spectrum.

Batch reactions for decarboxylation: liquid-phase decarboxylation of oleic acid is investigated in a 100 mL Hanwoul (Geumjeong-dong, South Korea) stirred batch reactor. Gas flow rates are controlled by Brooks (Warren, Mich.) metal sealed mass flow controllers. In all experiments, the catalyst is soaked in dodecane (solvent) prior to the reduction of the catalyst under $H_2$ flow of 60 mL/min. During the reduction step the agitation speed is kept at 250±2 rpm, and the pressure is 0.5 MPa. As soon as the desired pressure is reached, the temperature is increased to 200° C. with a temperature ramp of 10° C./min and kept under flowing $H_2$ for 1 hour at 200° C. After cooling the reactor under $H_2$ flow, excess $H_2$ is purged with inert gas and oleic acid is fed into the vessel through a one way valve.

For the activity test of each catalyst, about 0.45 g catalyst, about 2.0 g oleic acid and about 30.0 g solvent are used. Throughout the reaction, the agitation speed is kept at about 1000±4 rpm. Ar gas is added into the vessel in order to obtain about 1.5 MPa total pressure at about 300° C. After the reaction, the reactor is quenched in an ice bath and the final liquid product is analyzed. The standard deviation for conversion and product selectivities from a multiple run control experiment is ±2.4%.

Flow reactor: the continuous decarboxylation of brown grease is carried out in a fixed bed tubular reactor (40 mL BTRS-Jr, Autoclave Engineers, PA). Two grams of catalyst is placed between glass wool layers. The catalyst is first reduced at 200° C. and 0.5 MPa under $H_2$ flow. After reduction, the reactor is pressurized to 1.5 MPa under Ar gas and heated to 300° C. Oleic acid (0.2 M in dodecane) is continuously fed through the catalyst bed at a volumetric flow of 0.04 mL/min.

Analysis: liquid samples products are dissolved in carbon disulfide and are analyzed using a Perkin Elmer Clarus 500 gas chromatograph (GC) equipped with flame ionization detector (FID) and an Rtx-65 TG column (length: 30 m, internal diameter: 0.25 mm, phase film thickness: 0.10 μm). The GC oven temperature is programmed as follows: 2 min hold at 80° C., 10° C./min ramp to 300° C., 10 min hold at 300° C. The detector temperature is maintained at 300° C. Samples (1 μL) are injected into the column with a about 50:1 split ratio, and concentrations are determined relative to a methyl arachidate internal standard. In order to identify some of the products, a GC-MS (Clarus 500 GC-MS, Perkin-Elmer) with a capillary wax Rtx-WAX column (length: about 60 m, diameter: 0.25 mm, thickness of stationary phase 0.25 μm) is also used.

Change in the catalyst structure and the nature of surface groups: XRD patterns of the fresh palladium catalysts supported on activated carbon, silica and Si—C with four different silica to carbon ratios are shown in FIG. 1. For all catalysts except Pd/Si, a broad peak at 2θ of 23.9° and an overlapped broad peak at about 39.8° are observed, which correspond to the (002) and (100) diffractions of amorphous carbon for Pd/C, respectively. The d spacing of the (002) plane is 0.37 nm for Pd/C which is greater than that of graphitic carbon (0.343 nm), indicating that this catalyst does not contain graphitic carbon. For the Pd/Si catalyst, the broad peak at 22.0° corresponds to amorphous silica. The (002) amorphous carbon diffraction shifted from 23.9° to 23.0° as the Si amount increased. Several well-resolved peaks at 2θ of 40°, 47°, 68° and 82° that are assigned to the (111), (200), (220), and (311) reflections of the face-centered cubic (fcc) Pd lattice are observed in the XRD pattern of samples. Only in the Pd/Si—C-0.5 catalyst, Pd(311) diffraction is not observed. The palladium particle size calculated from the Scherrer formula for each catalyst is 6.7, 5.5, 5.9, 6.3, 6.2 and 4.1 nm for Si, Si—C-4, Si—C-2, Si—C-1, Si—C-0.5 and C supported Pd catalysts, respectively. The larger metal particle sizes for the silica modified samples compared to the activated carbon supported catalyst may be attributed to the nature of the surface groups on the support. It is believed that small metal particles agglomerate to larger particles because they become mobile on the surface when the surface groups thermally decompose during the metal reduction.

The TEM images of the fresh palladium catalysts supported on silica, Si—C-4, Si—C-2, Si—C-1, Si—C-0.5 and activated carbon are given in FIG. 2A-2F. The TEM image of the Pd/Si catalyst (FIG. 2A) displays a large distribution of sintered Pd particles with an average particle size of 5.3 nm. The larger particle size of Pd/Si catalyst may be due to the lower surface area of Si support and suggests that Pd particles are not stabilized by the oxide support. The inset of The TEM images of the fresh palladium catalysts supported on silica, Si—C-4, Si—C-2, Si—C-1, Si—C-0.5 and activated carbon are given in FIG. 2A-2F. The TEM image of the Pd/Si catalyst ((a) shows the large silica particles with about 100 nm. Pd/Si—C-4 has fairly narrow Pd particle size distribution with average particle size of 3.0 nm (FIG. 2B). The Pd metal appears to be clustered together rather than being spherical in Si—C-1 and Si—C-0.5 (FIGS. 2D and 2E). TEM image of Pd/C (The TEM images of the fresh palladium catalysts supported on silica, Si—C-4, Si—C-2, Si—C-1, Si—C-0.5 and activated carbon are given in FIG. 2A-2F. The TEM image of the Pd/Si catalyst (2F) shows very fine Pd particles. All the particle sizes observed by TEM images are slightly smaller than those are evidenced by XRD. Nevertheless, both TEM and XRD data confirmed the exwastence of sintered Pd particles in the Si, Si—C-1 and Si—C-0.5 supported catalysts.

Figure 2:
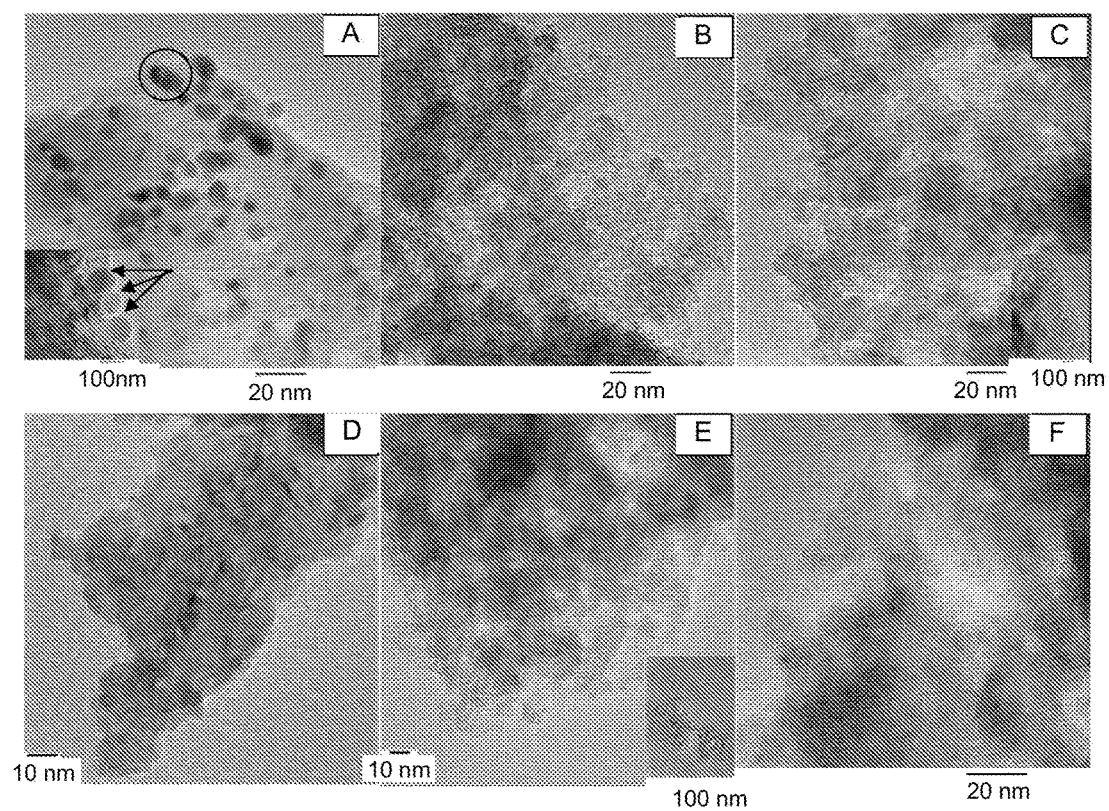
FIG. 2 are electron micrographs of fresh palladium catalysts supported on: A: silica, B: SiC (4:1), C: SiC (2:1), D: SiC (1:1), E: SiC (0.5:1), and F: activated carbon, and insets are the images with 100 nm scale bar.

FIG. 2 shows that all the catalysts display type-IV $N_2$ isotherms which is associated with monolayer-multilayer adsorption and capillary condensation taking place in mesopores. An H4-type hysteresis loop is also evident, which is often associated with the presence of mesopores with narrow slit-like pores. With increasing carbon content of the support, more obvious hysteresis loops are observed.

The capillary condensation step shifts to a lower relative pressure in a range of $P/P_o=0.44-0.92$ for the Pd/Si catalyst, which is related to the pore size reduction to 3.6 nm. This is likely due to shrinkage of the support's framework during the calcination at 550° C. The silica mesostructure may possibly have been destroyed during the carbon combustion from the Si—C-3 support. Pore size distribution curves of Si—C supported catalysts with different Si content (FIG. 3) shows a narrow pore size distribution. The Pd/Si shows bimodal-pores centered at 2.6 nm and 3.8 nm.

The activated carbon support has a high surface area and a well-developed porosity, with most of the surface area in the micropores. In the modified material, the sol-gel preparation of Pd/Si—C-1 and Pd/Si—C-0.5 (in the presence of ethanol) led to a significant decrease in the micropore volume as well as surface area (Table 1). This can be attributed to pore blockage by the silica particles. On the other hand, the silica content did not contribute to a significant change in the micropore volume of catalysts Pd/Si—C-4 and Pd/Si—C-2. As silica content increases in the support, the BET surface areas and total pore volumes decrease gradually. Yet the average pore diameters do not follow the same trend. For Si—C-2 and Si—C-4 supported catalysts, the pore sizes remain nearly constant at about 5.3 nm, which is the same as that of Pd/C, after Si addition to C. However, pore sizes greatly decreased in Pd/Si—C-0.5 and Pd/Si—C-1, which may be due to blockage of larger pores. This pore blockage may be due to hydrolysis of TEOS in the presence of ethanol-water mixture followed by a condensation that takes place between a silanol and ethoxy group. Bridging oxygen or silaxane group (Si—O—Si) forms as a result of these reactions where ethanol is used as a solvent during the catalyst preparation. Another explanation for the extensive reduction in pore volumes of Pd/Si—C-1 and Pd/Si—C-0.5 can be due to the silica products covering the micropores of activated carbon. This is possible with the addition of ethanol which causes dissolution of TEOS and subsequent absorption by the micropores of activated carbon during the preparation of Si—C-1 and Si—C-0.5. Capillary condensation may also contribute to this process, which causes the TEOS to more rapidly go deeper inside the pores. This is in contrast to catalysts Pd/Si—C-4 and Pd/Si—C-2 where ethanol is not used and the silica precursor did not fill the micropores. In the absence of ethanol, TEOS is immiscible with water, and the hydrolysis of TEOS does not occur. In this case, thermal decomposition of TEOS to form amorphous $SiO_2$ is expected with activation energy of −26 kJ/mol while acetaldehyde, formaldehyde, carbon dioxide, water and carbon monoxide formed as decomposition products. TEOS can be completely adsorbed on activated carbon, but not its decomposition products. The possibility of a complete hydrolysis of $Si(OC_2H_5)_4$ to $Si(OH)_4$ to give silicic acid is also considered for Pd/Si—C-0.5 and Pd/Si—C-1. However, such OH groups are not detected in FTIR analysis.

TABLE 1

Physicochemical Properties

| Catalyst | $S_{BET}$ (m²/g) | $S_m$ (m²/g) | $V_t$ (cm³/g) | $V_m$ (cm³/g) | $\Delta V$ (cm³/g) | $D_{BJH}$ (nm) |
|---|---|---|---|---|---|---|
| Pd/Si | 540 | — | 0.444 | — | — | 3.6 |
| Pd/Si—C-4 | 603 | 381 | 0.430 | 0.206 | 0.224 | 5.3 |
| Pd/Si—C-2 | 637 | 383 | 0.466 | 0.211 | 0.255 | 5.4 |
| Pd/Si—C-1 | 717 | 308 | 0.544 | 0.175 | 0.369 | 4.5 |
| Pd/Si—C-0.5 | 882 | 335 | 0.730 | 0.187 | 0.543 | 4.7 |
| Pd/C | 1002 | 363 | 0.941 | 0.206 | 0.735 | 5.3 |

$S_{BET}$: BET Surface area (t-Plot)
$S_m$: Micropore surface area (t-Plot)
$V_t$: Total pore volume of pores at P/Po = 0.985
$V_m$: Micropore Volume (t-Plot)
$\Delta V$: The difference between total and micro pore volumes (mesopore volume)
$D_{BJH}$: Pore diameter (BJH desorption average pore diameter (4 V/A))

Figure 4:
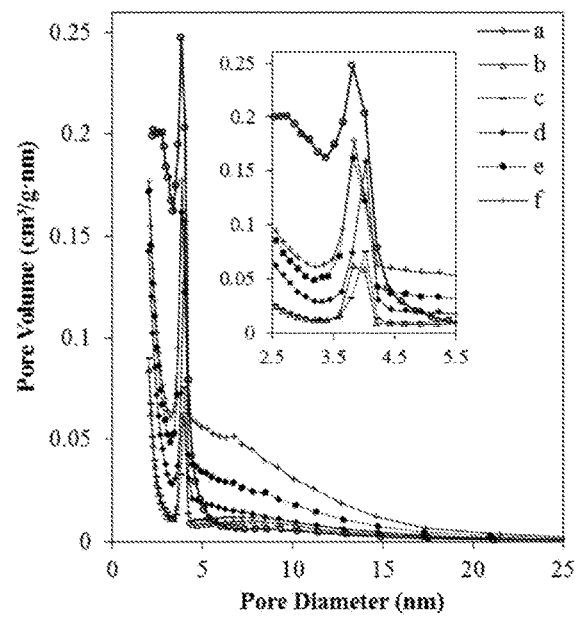
FIG. 4 illustrates pore size distribution curves of palladium supported on A: silica, B: SiC (4:1), C: SiC (2:1), D: SiC (1:1), E: SiC (0.5:1), and F: activated carbon.

Another characteristic of an activated carbon is the surface oxygen groups which determine the hydrophilic/hydrophobic properties of carbon support and make the surface acidic, basic or neutral. These surface groups play a very important role in the dispersion of the active phase, and thus in catalytic activity. The nature of the surface groups is identified by FTIR (FIG. 4). None of the samples shows the 2900-3800 cm$^{-1}$ OH absorption stretching band which is associated with hydroxyl groups. However, the development of the 960 cm$^{-1}$ Si—OH stretching band is observed in Pd/Si—C-4 and Pd/Si—C-2. The formation of the silica-carbon nanocomposites may be followed by the appearance of asymmetric stretching vibrations of Si—O—Si bonds, while incomplete condensation may be revealed by the presence of Si—OH groups. The dominant peak, located at 1056 cm$^{-1}$ in Pd/Si, is due to the Si—O—Si stretching absorption. Although the frequency of the Si—O—Si stretching band increased in Si—C supported catalysts up to 1085 cm$^{-1}$, it did not change with the Si content of the catalyst. However, the intensity of the peak at 1056-1085 cm$^{-1}$ increased significantly with increased Si content. A broad band between 1300 and 950 cm$^{-1}$ in the Pd/C spectra has a maximum at 1180 cm$^{-1}$ (C—O stretching in acids, alcohols, phenols, ethers and esters) and a shoulder at 991 cm$^{-1}$. Absorption in this region is usually found in oxidized carbons. The appearance of a band at 1203 cm$^{-1}$ may be due to the formation of phosphoric acid esters. Due to the overlap of absorption bands from Si—O in this region, an unambiguous assignment is difficult. For Pd/Si—C-0.5, C—O stretching vibration (1215 cm$^{-1}$) is higher than that for Pd/C (1180 cm$^{-1}$). Such higher absorption frequency is observed in lactones which can be seen as the condensation product of an alcohol group —OH and a carboxylic acid group —COOH. This absorption is not seen for the Si, Si—C-4 and Si—C-2 supported catalysts. The spectra (except for the Pd/Si) have a band between 1600-1580 cm$^{-1}$ due to C=C aromatic ring stretching vibrations enhanced by polar functional groups. While its intensity decreases with increasing Si amount, a small shift in Pd/Si—C-4 and Pd/Si—C-2 indicates an enlargement of the aromatic ring structure. The intensity of aromatic bands is lower for Pd/Si—C-0.5 and Pd/Si—C-1 catalysts than Pd/C while these bands are not seen in Pd/Si—C-2, Pd/Si—C-4 and Pd/Si. This may suggest that substitution of C—H bonds in the aromatic structure takes place and new C—R bonds form for the latter catalysts. For Pd/C, the absorptions at 1702 cm$^{-1}$ (C=O stretch) and 759 cm$^{-1}$ is due to C—H out of plane bending. The C=O stretch frequency is lower than that of a normal ester which is ~1740 cm$^{-1}$. This change in the C=O stretch frequency can be due to an unsaturation adjacent to the C—O— or α to the C=O. It can also explain the reason why its frequency is higher (1729 cm$^{-1}$) for Pd/Si—C-0.5 that that of Pd/C. The weak intensity of the C=O stretching vibration (1702 cm$^{-1}$) of Pd/Si—C-4 and Pd/Si—C-2 suggests that these two catalysts contain a small amount of carboxyl groups compared with Pd/C, Pd/Si—C-0.5 and Pd/Si—C-1. The main observation is that both Pd/Si—C-0.5 and Pd/Si—C-1 have similar surface groups to the Pd/C. On the other hand, Si, Si—C-4 and Si—C-2 supported catalysts do not contain these interactions.

Figure 5:
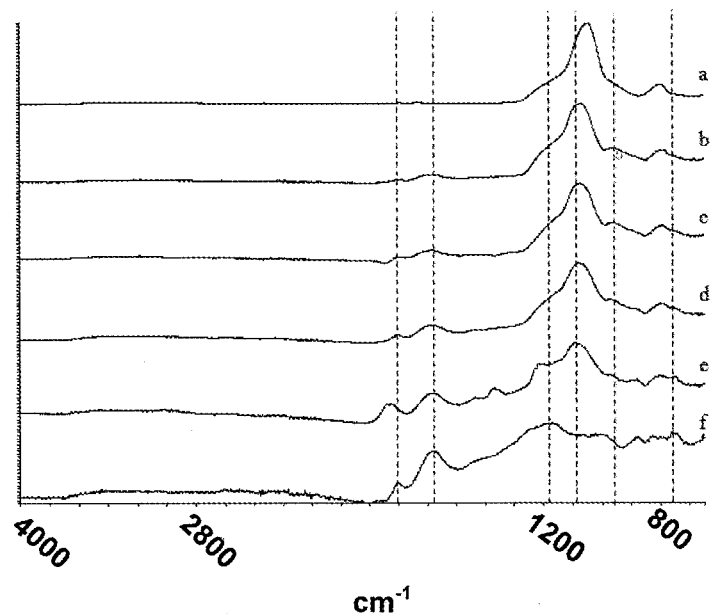
FIG. 5 shows FTIR results for fresh palladium catalysts supported on: A: silica, B: SiC (4:1), C: SiC (2:1), D: SiC (1:1), E: SiC (0.5:1), and F: activated carbon.

The FTIR spectra of the activated carbon, Si—C-4 and silica supports are shown in FIG. 5. The activated carbon support has a broad band between 1000-1300 cm$^{-1}$ which is assigned to CO bonds such as those exist in ethers, phenols, acids and esters. It has another broad band between 1500 and 1750 cm$^{-1}$ that can be assigned to carboxyl groups, quinones, ketones, lactones, diketone and keto-ester, and keto-enol. The weak absorptions between 700 and 950 cm$^{-1}$, assigned to aromatic structures substituted with out-of-plane deformation mode of C—H in variously substituted benzene rings by aliphatic groups, appear in the spectra of the AC, but they are absent in Si and Si—C-4 samples. The AC and Si—C-4 supports have 2 bands at 1580 and about 1700 cm$^{-1}$ due to the C=C stretching vibrations in aromatic rings enhanced by polar functional groups. However, these absorptions have lower intensity for the Si—C-4. The presence of a band at about 1700 cm$^{-1}$ may be due to the C=O stretching in carboxylic acid groups, esters, lactones and quinones. The AC support spectrum shows a wide absorption band at 3600-3200 cm$^{-1}$ with a maximum at 3404 cm$^{-1}$. This band can be assigned to the 0-H stretching of hydroxyl groups such as alcohols, phenols and adsorbed water. This band is more intense for AC than for Si—C-4 and Si.

Figure 6:
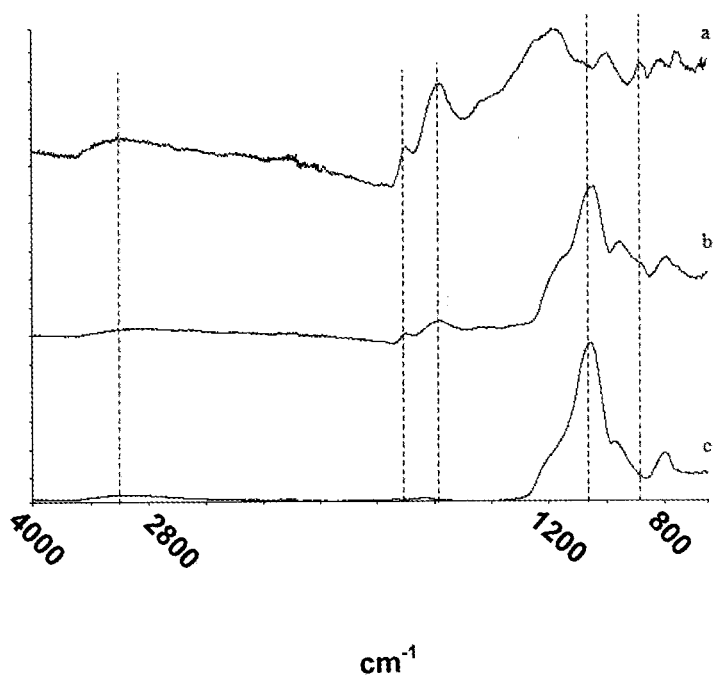
FIG. 6 shows FTIR of supports comprising A: activated carbon, B: Si—C-4, and C: silica.

The FTIR spectra for the used catalysts are shown in FIG. 6. The absorption bands are similar to the fresh catalyst (Pd/Si—C-4) after reactions but differences are in the relative intensities. The absorption bands at 2867 and 2919 cm-1 are observed only in the used catalysts. These peaks can originate from C—H stretching in CH$_2$ groups likely due to the adsorbed reaction products.

The acid-base titration method gives more information on oxygen surface functionality of the catalysts. Weakly acidic phenolic hydroxyl groups and strongly acidic carboxylic groups are neutralized by NaOH. Therefore, the total acidity is determined by neutralization. The total acid numbers of the catalysts are given in Table 2. The activated carbon supported catalyst shows some acidity which can originate from the surface oxygen groups and also from the storage conditions. When the acidic groups exist on the carbon surface, it becomes more accessible for aqueous metal precursors due to the decrease in the hydrophobicity of the carbon. The Pd/Si catalyst shows the greatest oxygen group content, with a predominant presence of stronger acidic groups. The Pd/Si—C-0.5 catalyst displayed the lowest total acidity.

TABLE 2

Acidity of supported 5% palladium catalysts

| Catalyst | Acidity (mmol/g$_{cat}$) |
|---|---|
| Pd/Si | 2.36 |
| Pd/Si—C-4 | 0.34 |
| Pd/Si—C-2 | 0.33 |

TABLE 2-continued

Acidity of supported 5% palladium catalysts

| Catalyst | Acidity (mmol/$g_{cat}$) |
|---|---|
| Pd/Si—C-1 | 1.53 |
| Pd/Si—C-0.5 | 0.12 |
| Pd/C | 1.65 |

Relationship between catalyst support, physiochemical properties, acidity and catalytic activity: the silica modification of the activated carbon surface produced significant changes in carbon porous texture and the surface chemistry; thus it can have dramatic effects on the catalytic activity. The analysis of the surface functionality by FTIR shows that the novel Pd/Si—C-4 catalyst has fewer surface interactions than the Pd/C catalyst, which makes it a more inert support.

Table 3 shows the correlation between Pd particle size and the catalytic properties for oleic acid decarboxylation. Both Pd/Si—C-4 and Pd/C shows high conversion of oleic acid while Pd/Si—C-4 exhibited the highest selectivity (31%) to n-heptadecane (n-C17). A high conversion of oleic acid is also observed for the Pd/Si—C-4 catalyst. However, the ability of Pd/Si in activating oleic acid to give a significant selectivity of the desired hydrocarbon products is inconsiderable (Table 3). According to the TEM, XRD and FTIR the catalysts Pd/Si—C-1 and Pd/Si—C-0.5 have s similar morphology, particle size and surface groups. These catalysts exhibit similar catalytic activity for the decarboxylation of oleic acid, which indicates that the particle size of Pd can influence the catalytic activity. The high activity of Pd/Si—C-4 catalyst can be attributed to accessible, small and well-distributed metallic Pd nanoparticles inside hybrid mesopores. In addition, having low acidity and less surface interaction on Pd/Si—C-4 catalyst rendered it more inert and led to higher catalytic activity.

different reaction route. This hybrid Si—C supported Pd catalyst favors a direct decarboxylation of oleic acid instead of C=C double bond hydrogenation. By eliminating the hydrogenation of oleic acid, the reaction steps are reduced. The selectivity to stearic acid is less than 0.05 wt % even after 1 hour reaction over Pd/Si—C-4 (Table) while Pd/C is reported to have 60% selectivity to stearic acid at 74% conversion of oleic acid. The exwastence of 8 and 1-heptadecenes is also identified with GC-MS. The formation of 8-heptedecene suggests the direct decarboxylation of oleic acid while formation of 1-heptedecene indicates the dehydrogenation of n-heptadecane and decarbonylation of oleic acid.

Figure 8:
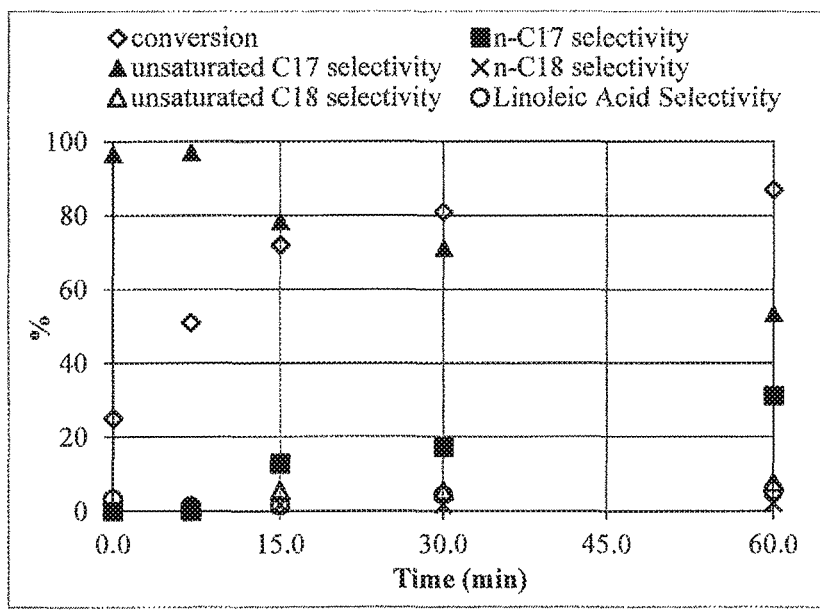
FIG. 8 shows oleic acid conversion and product selectivity in batch reaction at 300° C., 1.5 MPa on Pd/Si—C-4 catalyst.
Figure 9:
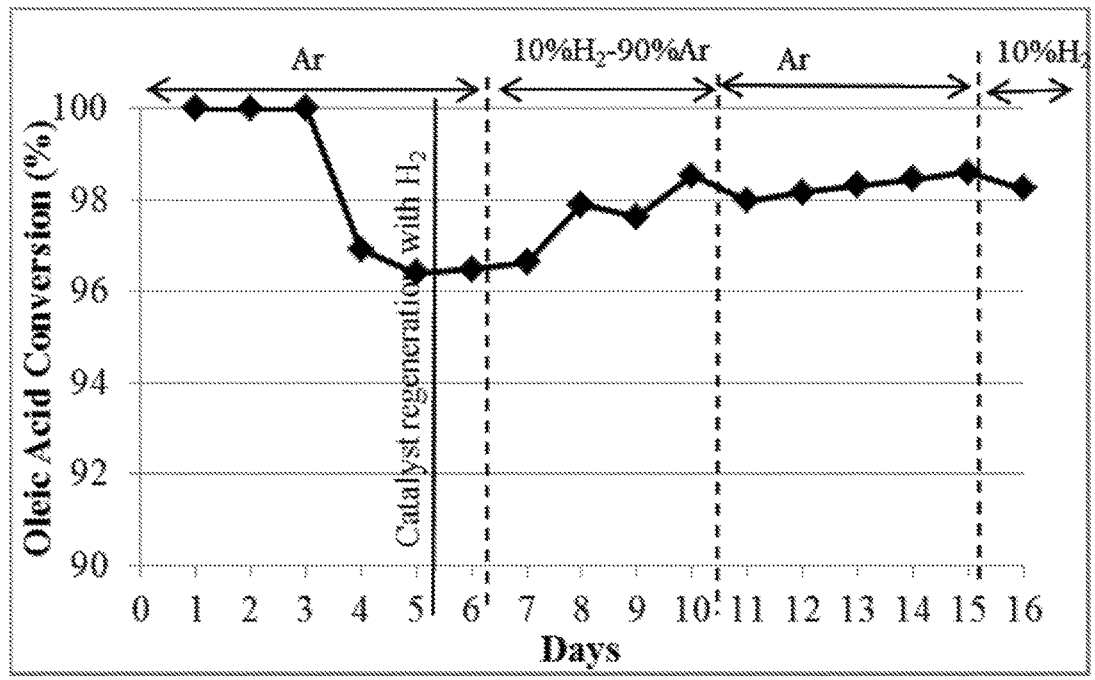
FIG. 9 shows oleic acid conversion in flow reaction at 300° C., 1.5 MPa on Pd/Si—C-4 catalyst with LHSV 1 hr$^{-1}$.
Figure 10:
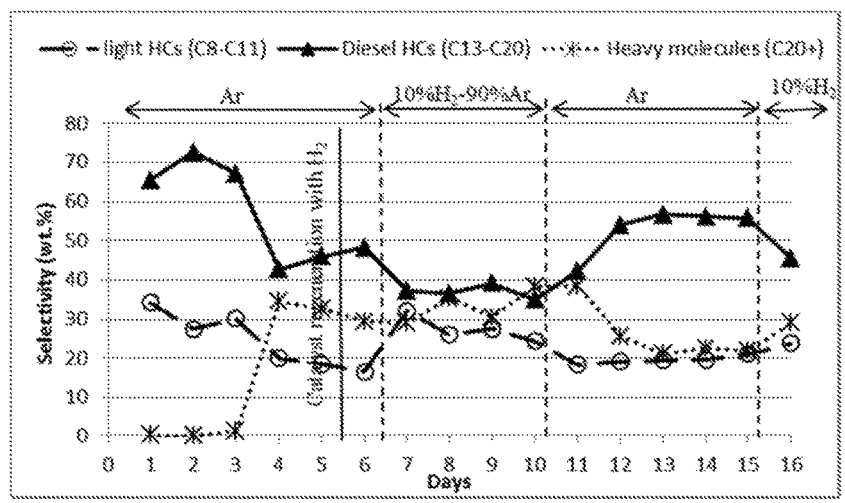
FIG. 10 illustrates product selectivity in flow reaction of oleic acid at 300° C., 1.5 MPa on Pd/Si—C-4 catalyst with LHSV 1 hr$^{-1}$.
Figure 11:
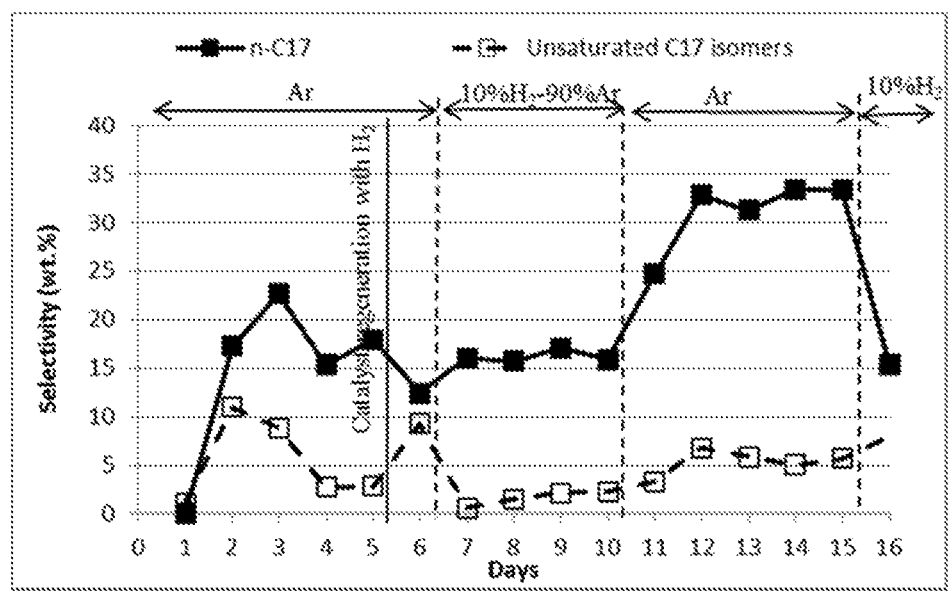
FIG. 11 shows n-C17 (saturated) and unsaturated C17 isomers selectivity in flow reaction of oleic acid at 300° C., 1.5 MPa on Pd/Si—C-4 catalyst with LHSV 1 hr$^{-1}$.

The stability of the Pd/Si—C-4 catalyst is investigated in a continuous flow reactor. The oleic acid conversion over 16 days of operation is shown in FIG. 8. Although there is a slight decrease in conversion after 3 days of reaction, the addition of 10% $H_2$ to the gas stream restored the conversion back to 100%. While the catalyst is stable for conversion of oleic acid for 16 days over Pd/Si—C-4 catalyst, there is a dramatic decrease in diesel hydrocarbon (HC) selectivity after 3 days of reaction (FIG. 9). After introducing 10% $H_2$ in the gas stream for 4 days, diesel HC selectivity increased to 55%. This selectivity is maintained in the absence of $H_2$. However, switching the gas flow back to 10% $H_2$-90% Ar resulted in a decrease in diesel selectivity. FIG. 10 shows the impact of removing the $H_2$ from input on the selectivity of decarboxylation products (n-C17 and unsaturated C17 isomers). It is clearly seen that switching back to an Ar gas stream yields double the n-C17 selectivity. Murzin's group indicated that the presence of $H_2$ in small quantities in the liquid phase helps to preserve the activity of the Pd/C catalyst. However, the silica modified AC supported Pd catalyst stability study shows that the addition of 10% $H_2$ does not necessarily favor the formation of decarboxylation products, but an $H_2$ treatment helped to regenerate the

TABLE 3

Correlation between Pd particle size and catalytic properties in oleic acid decarboxylation. Batch reaction for 1 hr.

| | | C18:1 | Selectivity (%) | | | | | | |
|---|---|---|---|---|---|---|---|---|---|
| 5% Pd Catalyst | $d_{Pd}$ (nm) | Conversion (%) | C18:0 | C18:2 | n-C17 | Unsaturated C17 | n-C18 | Unsaturated C18 | Others* |
| Si | 6.7 | 15 | <0.05 | <0.05 | 0.0 | 1.0 | 0.0 | 0.0 | 99 |
| Si—C-4 | 5.5 | 87 | <0.05 | 5.6 | 31.0 | 53.5 | 2.2 | 7.7 | <1 |
| Si—C-2 | 5.9 | 74 | 15.0 | 5.4 | 13.4 | 56.7 | 1.9 | 7.7 | <1 |
| Si—C-1 | 6.3 | 42 | 3.5 | 19.8 | 11.6 | 35.6 | 0.9 | 3.5 | 25.1 |
| Si—C-0.5 | 6.2 | 45 | 2.1 | 22.5 | 12.6 | 32.7 | 1.3 | 3.8 | 25 |
| C | 4.1 | 94 | <0.05 | 1.8 | 19.2 | 71.7 | 1.6 | 5.7 | 0 |

$d_{Pd}$: Pd metal particle size (XRD)

Figure 7:
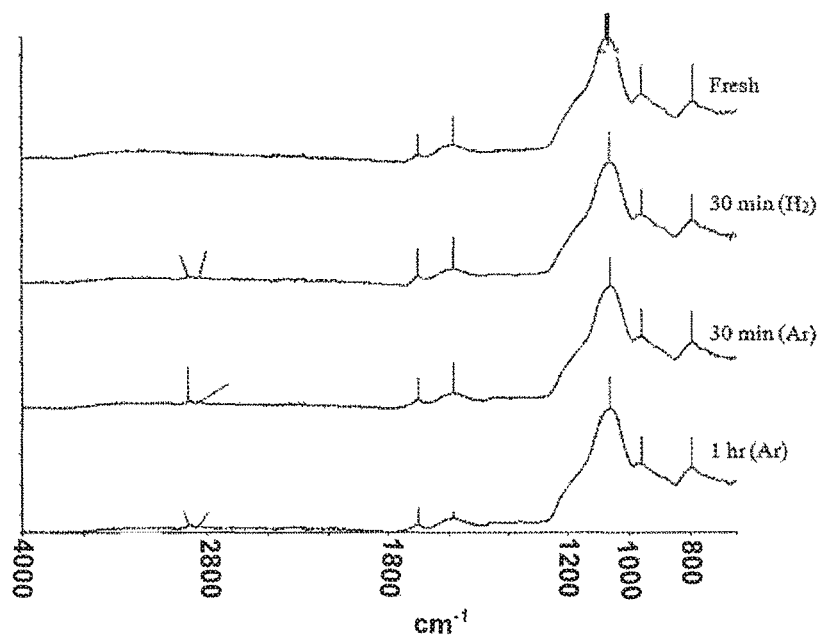
FIG. 7 shows FTIR of the Pd/Si—C-4 catalyst before and after oleic acid batch reaction at 300° C. and about 1.5 megapascal (MPa)

Decarboxylation activity of Pd/Si—C-4 in the absence of $H_2$: the dependence of the reactant conversion and product selectivity as a function of reaction time at 15 bar and 300° C. over 5% Pd metal supported on Si—C-4 are displayed in FIG. 7. At the beginning of the reaction, unsaturated C-17 selectivity is almost 100%. When conversion reaches about 80%, unsaturated C-17 selectivity decreased and saturated n-C17 selectivity increased. This indicates that the C=C double bond hydrogenation is taking place after decarboxylation of oleic acid under the reaction conditions. Unlike Pd/C, which may catalyze the oleic acid C=C bond via hydrogenation prior to decarboxylation of the resultant saturated FFA (stearic acid), Pd/Si—C-4 catalyst follows a decarboxylation sites of the catalyst. Hydrogen may be adsorbed on Pd (111) surface of a palladium cluster to the gas phase decarboxylation of butanoic acid, and shows that the adsorbed surface intermediate, $C_2H_5$—CH—COO, forms propylidene in the absence of adsorbed H while —$C_3H_7$ is formed in the presence of adsorbed H. The decomposition of the bulk $PdC_x$ phase of Pd/C at 150° C. in $H_2$ and this decomposition is observed at 427° C. in an inert atmosphere. Such regeneration can help if the interstitial C in the Pd crystallites forms during the reaction. However, the XRD study of used Pd/Si—C-4 catalyst revealed that there is no lattice expansion after reaction which would indicate the presence of a $PdC_x$ phase.

A regeneration step to remove the adsorbed reactants from the active metal surface can be suggested instead of a continuous $H_2$ feed into the system. In a liquid phase fatty acid decarboxylation on a 5% Pd/C catalyst, optimum $H_2$ amount is necessary to keep the decarboxylation activity high because higher $H_2$ partial pressure causes a switch in the reaction mechanism from decarboxylation to decarbonylation. FIG. 10 clearly shows that the novel Pd/Si—C catalyst's decarboxylation activity is restored after the $H_2$-treatment (after Day-10).

The Pd/Si—C-4 catalyst maintained the highest reported conversion up to 16 days on stream towards selective decarboxylation of FFA on a supported Pd catalyst under similar reaction conditions without assistance of $H_2$ input. For example, Pd/C catalyst shows stable activity only up to 45 h by maintaining 15% conversion of concentrated stearic acid at 360° C. under 1 MPa 5 vol % $H_2$ in argon while a commercial Pd/C catalyst maintained its stability up to 92 h at 40% conversion. A mesoporous 1% Pd/C (egg-shell) catalyst is deactivating slowly and is rather stable at around 10% conversion up to 5 days at a 0.5 mol/L saturated FFA feed with WHSV 1.7 $h^{-1}$.

A novel process is proposed for nanocomposite silica-carbon supported catalyst synthesis in which precursors of the raw materials are mixed with activated carbon powder. The characteristic of this technique is to employ a low-temperature procedure which saves energy and time in the catalyst preparation.

The decarboxylation activities of different amount of silica containing catalysts are investigated in a batch reactor under inert gas. Among them, the formulation with the fewer oxygen surface groups (less carboxyl group, C=O) (Pd/Si—C-4) is the most active catalyst for the decarboxylation of an unsaturated FFA in the absence of $H_2$. The high activity of the Pd/Si—C-4 catalyst is attributed to its accessible and well-distributed metallic Pd nanoparticles inside hybrid mesopores as well as to its low acidity, weak surface interactions and inertness. The novel catalyst is capable of catalyzing a decarboxylation reaction from an unsaturated FFA in the absence of $H_2$, and is highly stable for oleic acid conversion selectively for green diesel production. However, a regenerative $H_2$ treatment is necessary to restore the catalytic activity and the desired product selectivity. Thus, Pd supported on carbon modified with silica may be regarded as a prospective decarboxylation catalyst for the removal of oxygen from vegetable oil/animal fat without the need of additional $H_2$.

Brown grease decarboxylation: the FFAs used in this investigation are: stearic acid (≥95%), oleic acid (technical grade, 90%) and linoleic acid (60%) purchased from Sigma Aldrich (St. Louis, Mo.). Dodecane ($CH_3(CH_2)_{10}CH_3$, anhydrous, ≥99%), used as a solvent, and carbon disulfide ($CS_2$) are purchased from Sigma Aldrich. Ultra high purity grade argon (Ar) and hydrogen ($H_2$) are purchased from Cryogenic Gases (Detroit, Mich.). A commercial catalyst in powder form with 5 wt. % palladium on activated carbon support (Pd/C) is purchased from Sigma Aldrich. Methyl arachidate purchased from Nu-Chek Prep Inc. (Elysian, Minn.) is used as an internal standard. Brown grease is obtained from NextDiesel (Adrian, Mich.).

The decarboxylation of brown grease over 5 wt. % Pd/C commercial powder catalyst is investigated in a 100 mL Hanwoul (Geumjeong-dong, South Korea) stirred batch reactor. Gas flow rates are controlled by metal sealed mass flow controllers (Brooks, Warren, Mich.). In all experiments, the catalyst is soaked in dodecane (solvent) prior to the reduction of the catalyst under $H_2$ flow of 60 mL/min. During the reduction step the agitation speed is kept at 250±2 rpm, and the pressure is 0.5 MPa. As soon as the desired pressure is reached, the temperature is increased to 200° C. with a temperature ramp of 10° C./min and kept under flowing $H_2$ for 1 hour at 200° C. After cooling the reactor under $H_2$ flow, excess $H_2$ is purged with inert gas and the reactor is opened to add reactants into the vessel.

In a majority of the studies, about 7 wt. % brown grease in solvent with 65/1 (wt./wt.) ratio of solvent/catalyst is used. The catalyst loading (catalyst/feed=0.2 (wt./wt.)) is comparable with those reported in the literature. Throughout the reaction, the agitation speed is kept at 1000±4 rpm. In the batch mode reactions, 10 or 50 vol. % H2 balanced with Ar is added into the vessel at room temperature in order to obtain 1.5 MPa at 300° C. After the reaction, the reactor is cooled down to room temperature and the final liquid product is analyzed. In some cases, a liquid sampling condenser is used.

Semi-batch method: the stirred batch reactor may also be employed in a semi-batch mode. In the semi-batch mode, 10 or 50 vol. % $H_2$ balanced with Ar is fed continuously through the reactor at a flow rate of 60 mL/min. A Swagelok relief valve that is set to operate at 1.5 MPa is used to remove the gases continuously in order to maintain the set pressure.

A pre-hydrotreatment of BG is employed in semi-batch mode before the decarboxylation step to investigate the effect of pre-treatment of brown grease with $H_2$. During the pre-treatment, about 0.45 g of about 5% Pd/C catalyst and about 2 g of BG are used under a gas flow of 30 mL/min $H_2$ and 30 mL/min Ar. The pre-treatment is completed in 2 hours at 100° C. and 1.5 MPa.

Analysis method: liquid samples are obtained by centrifuging the product and separating the catalyst powder from the liquid product. After dissolving in carbon disulfide, liquid samples are analyzed using a gas chromatograph (GC) equipped with flame ionization detector (FID) and a Restek (Rtx-65 TG) column (length: 30 m, internal diameter: 0.25 mm, phase film thickness: 0.10 μm) which provides separation for both hydrocarbons and FFAs without requiring derivatization for sample preparation. The GC oven temperature is programmed as follows: 2 min hold at 80° C., 10° C./min ramp to 300° C., 10 min hold at 300° C. The detector temperature is maintained at 300° C. Samples (1 μL) are injected into the column with a 50:1 split ratio, and concentrations are determined relative to a methyl arachidate internal standard. In order to identify the products, a GC-MS (Clarus 500 GC-MS, Perkin-Elmer) with a capillary wax Rtx-WAX column (length: 60 m, diameter: 0.25 mm, thickness of stationary phase 0.25 μm) is also used.

Brown grease contains 15±5% macromolecules. In order to remove the macromolecular components, brown grease dissolved in dodecane solvent is vacuum filtered using a filter paper (Whatman #42) with a 2.5 μm pore size. After filtration, 75 wt. % of the BG passed through the filter paper with the solvent while the remaining portion is captured in gel form. The filtered BG analyzed by GC-FID yields approximately 94 wt. % FFAs while 6 wt. % could not be identified (Table 4), which is in good agreement with a previously reported BG analysis.

TABLE 4

Fatty acid composition of brown grease (trap grease).

| FFAs (wt. %) | Brown Grease (Kim, et al., 2010) | Trap Grease (Wang, et al., 2008) | [a]Filtered BG (Current Study) |
|---|---|---|---|
| Myristic acid C14:0 | 1.5 | 1.16 | 0-0.3 |
| Palmitic acid C16:0 | 23.8 | 30.38 | 29.7 ± 0.9 |
| Palmitoleic acid C16:1 | 1.9 | 1.42 | 0-0.2 |
| Stearic acid C18:0 | 4.1 | 6.02 | 6.7 ± 0.7 |
| Oleic acid C18:1 | 48.7 | 38.39 | 53.7 ± 6.4 |
| Linoleic acid C18:2 | 17.8 | 18.83 | 6.2 ± 3.7 |
| Linolenic acid C18:3 | 2.3 | 1.31 | 2.5 |
| Unidentified fatty acids | — | 2.49 | 5.7 ± 2.8 |

[a]FFA content of filtered brown grease analyzed by GC-FID via dilution of brown grease

TABLE 5

Conversion and liquid product selectivities of batch decarboxylation of brown grease and pure FFAs with different unsaturation levels. Reaction conditions: 6 wt. % reactant in dodecane, solvent/catalyst = 66/1 (wt./wt.), initial $H_2$/Ar ratio of 1/9 (vol./vol.), 6 hr batch reaction at 300° C. and 1.5 MPa over 5% Pd/C catalyst

| Reactant | FFA Conversion (%) | $C_6$-$C_{11}$ Selectivity (%) | $nC_{13}$-$nC_{18}$ paraffin Selectivity (%) | Unsaturated $C_{13}$-$C_{18}$ Selectivity (%) | $C_{25+}$ Selectivity (%) |
|---|---|---|---|---|---|
| [a]Stearic Acid (C18:0) | 94.8 | 0 | 95.4 | 3.3 | 1.3 |
| Oleic Acid (C18:1) | 99.4 | 0 | 94.3 | 4.4 | 1.3 |
| [b]Oleic Acid (C18:1) | 95.5 | 0.4 | 99.6 | 0 | 0 |
| Linoleic Acid (C18:2) | 90.0 | 0 | 68.6 | 28.3 | 3.2 |
| Mixture of: Stearic Acid (10 wt. %) Oleic Acid (65 wt. %) Linoleic Acid (25 wt. %) | 93.5 | 0 | 87.4 | 12.6 | 0 |
| Pre-hydrotreated Mixture of: Stearic Acid (10 wt. %) Oleic Acid (65 wt. %) Linoleic Acid (25 wt. %) | 98.4 | 0 | 91.4 | 8.6 | 0 |
| Brown Grease (BG) | 37.9 | 0 | 63.6 | 23.4 | 13.0 |
| Pre-hydrotreated BG | 52.0 | 0 | 59.8 | 40.2 | 0 |

[a]1 hour
[b]Initial $H_2$/Ar ratio = 1/1 (vol./vol.)

Brown grease decarboxylation is studied over activated carbon supported palladium catalyst at 300° C. and 1.5 MPa in the semi-batch reaction mode. In FIG. 12A-D, the 1 hour data point corresponds to the beginning of decarboxylation because the reaction temperature of 300° C. is reached at that moment (West 6100+ Temperature Controller). Since at 1 hour, the FFAs conversion reached almost 50% (FIG. 12A), conversion of FFAs should have started before the temperature reached 300° C. Also, the GC-FID chromatogram (FIG. 12B) shows that the selective hydrogenation of C═C double bonds to stearic acid (disappearance of peaks 12, 13, 14 and increase in intensity of peak 11) is taking place during the heating of the reaction mixture to 300° C. Formation of stearic acid intermediates from hydrogenation of double bonds during oleic acid decarboxylation under similar reaction conditions is known. Because the oleic acid content of brown grease can be as high as 50 wt. %, intermediate stearic acid formation may occur. Once all the oleic acid (C18:1), linoleic acid (C18:2) and linolenic acid (C18:3) are saturated (FIG. 12B), the rate of stearic acid (C18:0) decarboxylation proceeds faster between 1-3 hour than between 3-7 hour (FIG. 12A). It should be noted that the increase in intermediates (C16:0 and C18:0) concentration, as a result of selective hydrogenation, leads to an increase in saturated n-C13-n-C18 HCs selectivity for the first 2 hours of reaction (FIG. 12C). FIG. 12C shows the liquid product selectivities as a function of time in the semi-batch reaction mode. The liquid product selectivity ($S_{i,t}$) is defined as $$S_{i,t}(\%) = \frac{C_{i,t}}{C_{p,t}} \times 100$$

where Ci,t is concentration of product i and Cp,t is the liquid product concentration at time t. n-Paraffins obtained in the given range consist of tridecane (n-C13), pentadecane (n-C15) and heptadecane (n-C17) at 2 hours. The increase in saturated nC13-nC18 HCs selectivity and decrease in unsaturated nC13-nC18 selectivity (FIG. 12C) between 1-2 hours indicates that some of the olefins are getting saturated by $H_2$ and forming n-paraffins. A similar observation has been reported elsewhere for stearic acid deoxygenation.

Due to the high unsaturation level of the BG, the formation of heavier products (>C25) is observed within the first hour (FIG. 12C). There is a sharp decrease in C25+ selectivity between 1-2 hours which may be attributed to the fact that most unsaturated FFAs become saturated. However, the later increase in C25+ selectivity between 2-3 hours is likely due to some olimers transforming into heavier products. Another possible explanation for the presence of heavy compounds can be attributed to the formation of fatty acid (possibly stearic acid) dimers. Usually oleic acid is catalyzed in the presence of a clay catalyst or an acid catalyst at more than 230° C. to form oleic acid dimers via a Diels-Alder mechanism. Pd/C catalyst is known for hydrogenation of oleic acid dimer to stearic acid dimer. The observation of a light yellow color in the heavy compound containing products may be indicative of the formation of stearic acid dimers. Formation of such dimer molecules is also observed during deoxygenation of C18 FFAs over mesoporous Pd/C catalyst. However, a more detailed investigation of dimer formation from pure FFAs in the presence of Pd/C catalyst is needed in order to have a better understanding of the BG conversion process.

After 7 hours of reaction, the product also contains n-hexadecane (n-C16) and n-octadecane (n-C18) with selectivities of 1.3% and 0.6% respectively. One possible reaction pathway for formation of n-C16 and n-C18 hydrocarbons from C16:0 and C18:0 FFAs is hydrodeoxygenation (HDO, FIG. 13). Although water is not captured in the liquid product, it is detected in the reactor effluent with gaseous products coming through the relief valve which is used to maintain the set pressure by continuously releasing the gaseous products, inert gas and unreacted $H_2$. Also, some of the water produced by HDO may participate in the water-gas shift reaction. In the beginning of the reaction, the low initial $H_2$ partial pressure (0.09 MPa) results in higher selectivity towards decarboxylation reaction pathway over HDO. After 7 hours of reaction, most FFAs have been converted resulted in excess hydrogen to FFA, which favors the HDO reaction.

Apart from the BG conversion, reaction of the dodecane solvent is also observed. Yield of other C12 hydrocarbons is shown as a function of time in FIG. 12D. Within the first hour of reaction, dehydrogenation of solvent to other C12 hydrocarbons is increasing. However, continuous $H_2$ supply in the semi-batch reaction saturates these components back to dodecane.

The effect of solvent dilution on the reaction is investigated in both a semi-batch reactor under continuous flow ratio of 1/1 (vol./vol.) $H_2$/Ar and a batch reactor. Liquid product selectivities and FFA conversions after 6 hours of reaction are given in FIG. 14A. It is clear that solvent dilution does not show any significant impact on FFA conversion. Regardless of BG concentration in the solvent, semi-batch operation can yield over 95% BG conversion while batch can only yield 40% conversion under similar reaction conditions. This can be attributed to a continuous fresh $H_2$ supply and removal of gaseous products in semi-batch mode. The highest green diesel hydrocarbon (n-C13-n-C18) selectivity is obtained with 7 wt. % BG in semi-batch mode; and increasing BG concentration from 7 wt. % to either 25 wt. % or 50 wt. % in semi-batch mode resulted in a decrease in green diesel hydrocarbons selectivity and in an increase in C25+ selectivity. This is because the higher BG concentration means higher unsaturated FFAs concentration. More unsaturated FFAs will yield more C25+ molecules.

The most significant effect of increasing BG concentration in the batch reactor is a decrease in n-C13-n-C18 range paraffin selectivity and increase in the C13-C18 range olefin. In contrast to semi-batch mode, the lack of $H_2$ apparently causes an increase in C13-C18 olefins selectivity. This suggests that the main reaction pathway for unsaturated hydrocarbon (HC) formation is decarbonylation for a $H_2$ rich environment while dehydrogenation plays a significant role in a low $H_2$ concentration containing system.

Figure 13:
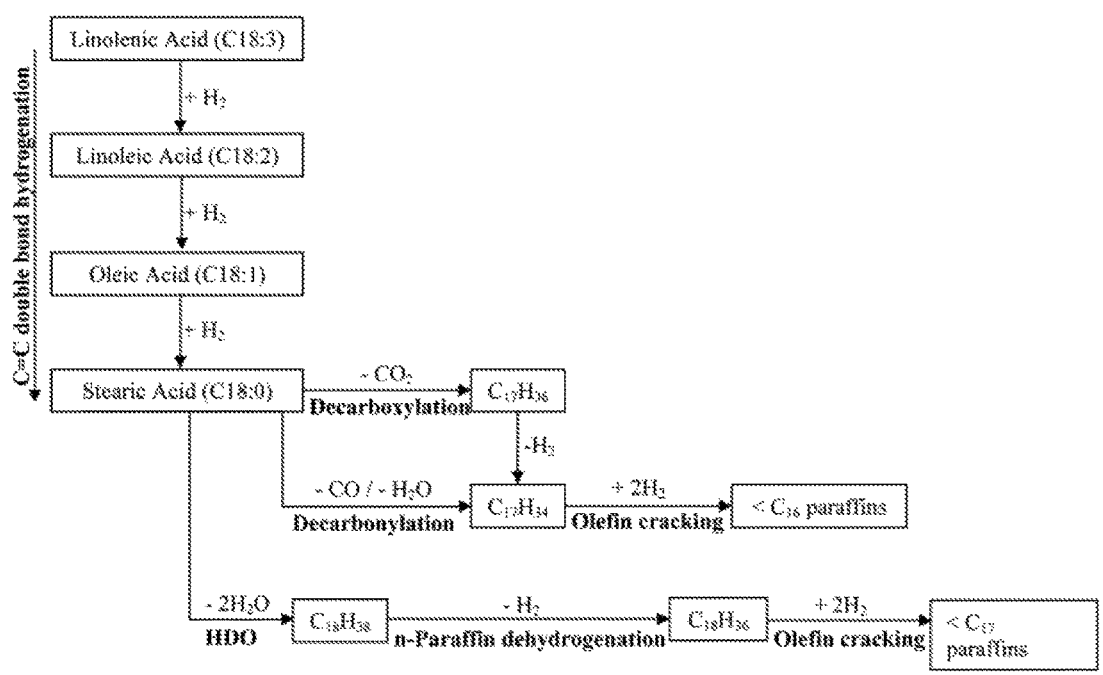
FIG. 13 shows liquid phase reactions of brown grease conversion to diesel fuel at 300° C. and 1.5 MPa.
Figure 14:
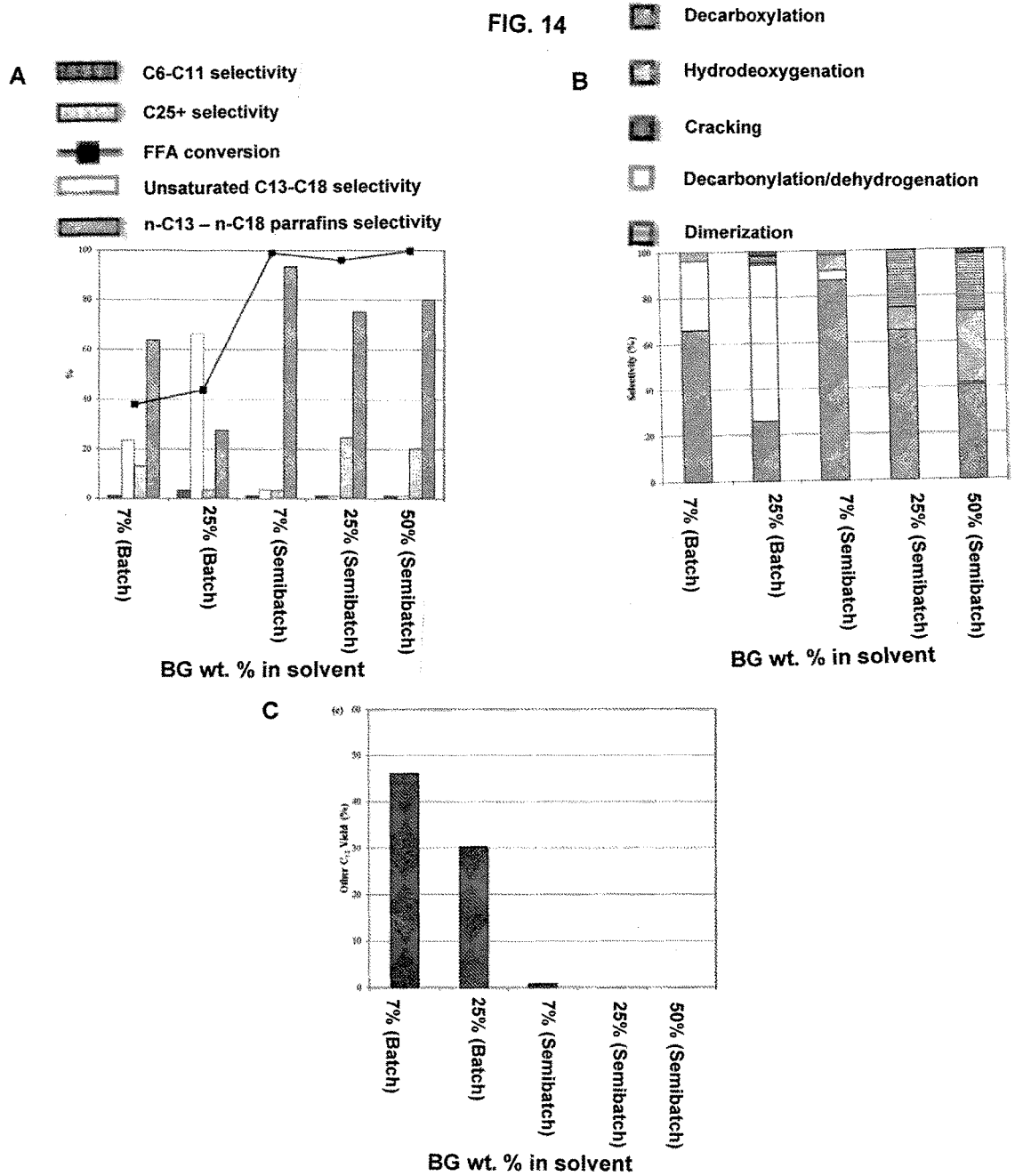
FIG. 14 shows the effect of solvent dilution on (a) Liquid product selectivities and FFAs conversions; (b) Selectivities of liquid phase reactions; (c) Yield to other C12 hydrocarbons from solvent, under following reaction conditions: 5% Pd/C catalyst, BG/Catalyst=5/1 (wt./wt.), heating rate 9° C./min, 300° C., 1.5 MPa, 6 hour; For batch mode: initial $H_2$/BG=0.4/1 (mol/mol); For semi-batch mode: 48 ml/min gas flow of 1/1 (vol./vol.) $H_2$/Ar.
Figure 17A:
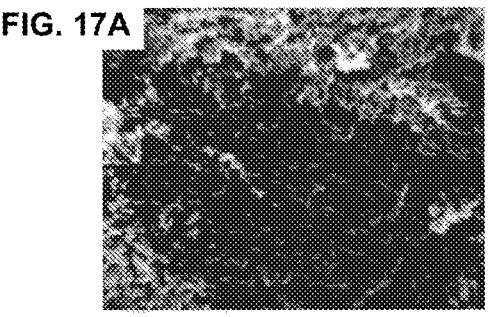
FIG. 17A-17D are scanning electron micrographs of samples of Pd$_2$Co/C-200 with Pd loading of A: 0.5%, B: 1%, C: 3%, and D: 5%.
Figure 17B:
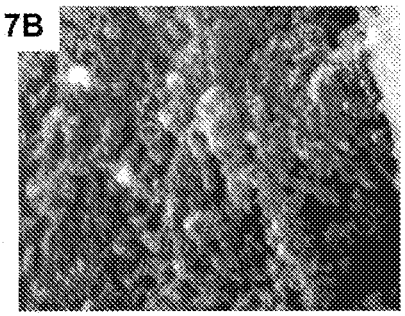
Figure 17C:
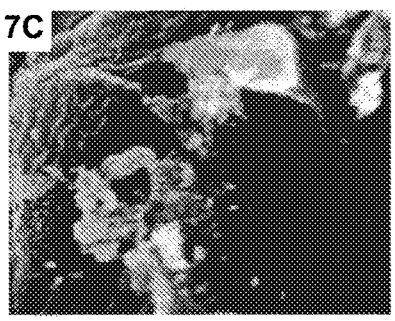
Figure 17D:
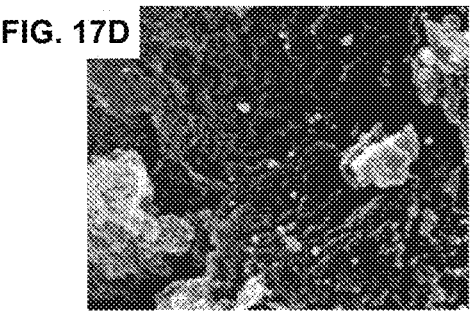

The selectivities of the liquid phase reactions (FIG. 14B) are calculated based on the liquid products; for instance odd carbon number containing n-paraffins are products of decarboxylation while even carbon number containing n-paraffins resulted from hydrodeoxygenation. Although long-chain paraffins are known to be prone to cracking, cracking selectivity is very low under experimental conditions (FIG. 14B). On the other hand, for batch reaction, there is a high olefin (especially unsaturated C17) selectivity which is attributed to the decarboxylation of unsaturated FFAs or to the decarbonylation of FFAs. Gas phase GC-FID analysis (CO and $CO_2$ generation) indicates both decarbonylation as well as decarboxylation are taking place under these reaction conditions. Moreover, palladium has a high catalytic activity for dehydrogenation as well as hydrogenation reactions. In order to obtain 10% conversion of n-paraffin (>C12) via dehydrogenation, operation at mild reaction conditions (below 350° C. and 1 atm) is needed over a noble metal catalyst.26 Paraffin dehydrogenation is an endothermic reaction with a heat of reaction of about 125 kJ/mol. Therefore, it is likely that olefins are produced via both dehydrogenation (Reaction I) of paraffins and decarbonylation (Reaction II) of BG FFAs (FIG. 13). Whether produced via dehydrogenation or decarbonylation, the n-monoolefins can be further hydrogenated in the presence of $H_2$.

I. Dehydrogenation: $C_nH_{2n+2} \leftrightarrows C_nH_{2n}+H_2$ ($\Delta H=125$ kJ/mol)

II. Decarbonylation: $C_nH_{2n}O_2 \rightarrow C_{n-1}H_{2(n-1)}+H_2O+CO$ ($\Delta H=179.1$ kJ/mol)

Decarboxylation of BG is the primary reaction with a selectivity of 87% for a 7 wt. % BG-93 wt. % solvent system under 50 vol. % $H_2$-50 vol. % Ar flow in semi-batch mode (FIG. 14B). When brown grease concentration is increased, selectivity to decarboxylation and decarbonylation/dehydrogenation decreased significantly; while HDO and oligomerization increased (FIG. 14B). Therefore, with a dilute solution of BG, side reactions are minimized and primary n-pentadecane (n-C15) and n-heptadecane (n-C17) products increase. Similar solvent dilution effects are also observed in various hydrogenation processes.

Figure 3:
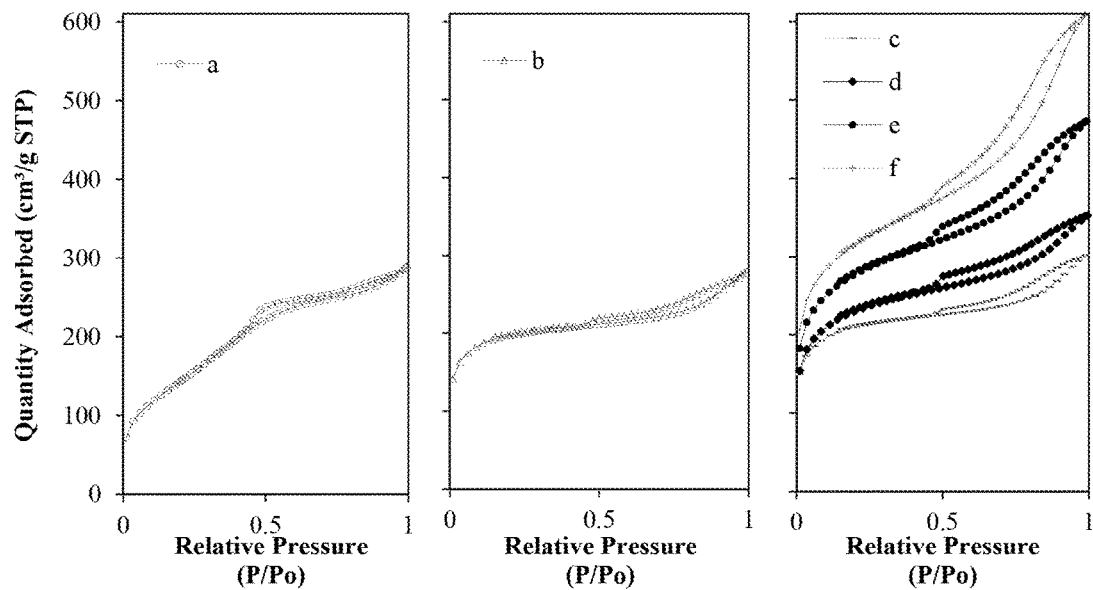
FIG. 3 illustrates N2 sorption isotherms of palladium supported on A: silica, B: SiC (4:1), C: SiC (2:1), D: SiC (1:1), E: SiC (0.5:1), and F: activated carbon.

Under the same reaction conditions the solvent dodecane (n-C12) undergoes a chemical transformation to other forms of C12 hydrocarbons such as olefins, dienes, aromatics and olefin cracking as follows:

III. Olefin formation: $C_{12}H_{26} \leftrightarrows C_{12}H_{24}+H_2$
IV. Diene formation: $C_{12}H_{24} \leftrightarrows C_{12}H_{24}+H_2$
V. Aromatic formation: $C_{12}H_{22} \leftrightarrows C_{12}H_{18}+H_2$
VI. Olefin cracking: $C_{12}H_{24}+2H_2 \leftrightarrows <C_{11}$ hydrocarbons Also, in a blank solvent (dodecane) experiment under the similar reaction conditions, H2 generation is observed which confirms the dehydrogenation of dodecane. The other C12 yield decreased from 46% (batch, 7% BG) to 30% (semi-batch, 7% BG); while increasing BG concentration from 7% to 50% in semi-batch mode resulted in a total elimination of other C12 hydrocarbon formation (FIG. 3-c). Thus, the $H_2$ concentration has a small effect on the other C12 hydrocarbon yields, while the solvent dilution has a strong effect.

To investigate the effect of the degree of unsaturation of BG FFAs on decarboxylation, pure stearic (C18:0), oleic (C18:1) and linoleic (C18:2) acids as well as a mixture of these components are used in separate batch reactions as representative FFA compounds of BG. The results are shown in Table 5. Stearic acid batch decarboxylation yielded 94.8% conversion to mainly n-heptadecane (S=93.8%) in 1 hour at 300° C., and a 100% conversion is achieved within 2 hours. This suggests that, under the same conditions, pre-hydrotreated BG which consists of mainly stearic acid should be completely converted to mainly n-$C_{17}$ within 2 hours. In contrast, pre-hydrotreated BG conversion is 52% and n-paraffin selectivity decreased to 59.8% after 6 hours (Table 5). This can possibly be attributed to catalyst poisoning by BG impurities. In oleic acid decarboxylation, FFA conversion is 99.4% after 6 hours of reaction in the presence of 1/9 (vol./vol.) $H_2$/Ar gas (Table 5). Similar to the BG results, increasing the $H_2$/Ar ratio to 1/1 (vol./vol.) leads to an increase in n-paraffin selectivity (99.6%) with no observable unsaturated hydrocarbons and C25+ products. When only linoleic acid is used in a batch reaction, the conversion slightly decreases to 90. However, there is a bigger impact on product distribution. The selectivity of n-paraffins and olefins in the diesel range changes from 95.4% and 3.3% to 68.6% and 28.3% respectively, when reactant is switched from a saturated FFA (stearic acid) to an unsaturated FFA (linoleic acid). When a mixture of stearic, oleic and linoleic acids is reacted, the conversion of FFAs and the product selectivities are in good agreement with the weighted average of the individual component results. Pre-hydrotreating the FFA mixture improved the conversion and n-paraffin selectivity slightly, but neither FFA conversion nor product selectivities are the same as that of stearic acid.

A separate experiment of BG partial hydrogenation is conducted to determine how long it takes to obtain saturated FFA intermediates such as C16:0 and C18:0 from BG. Within 2 hours all of the unsaturated FFA compounds of BG are saturated at 100° C. and 1.5 MPa in a solvent free system and under a flowing 1/1 (vol./vol.) ratio of $H_2$/Ar gases. The GC-FID analysis confirmed formation of palmitic acid and stearic acids along with n-pentadecane (2.9% yield) and n-heptadecane (46% yield), indicating the partial hydrogenation of BG along with decarboxylation reaction at a lower temperature (100° C.). Although it is reported elsewhere that pure FFA compounds do not show any decarboxylation activity at 100° C., here we observe a different phenomenon in a solvent free reaction atmosphere comparing with approximately 99 wt. % solvent use. Regarding the formation of heptadecenes (7.3% yield). It is believed that this dehydrogenation/decarbonylation step occurs due to the solvent free atmosphere where the products are not removed quickly from the catalyst surface; therefore n-C17 product further reacted to form heptadecene isomers. Such isomers are formed during decarboxylation of stearic acid with Pd/C catalyst at 300° C. and 1.7 MPa, conditions much higher than reported here.

Assuming the mixture of FFAs given in Table 5 represents BG, a study compare reactions of FFA mixture and BG. The conversion of BG is significantly lower than that of the FFA mixture. However, after pre-hydrogenation, the BG conversion improves by 27% while conversion of the FFA mixture improves by 5%. Moreover, pre-hydrogenation helps to increase selectivity of diesel range n-paraffins and to decrease diesel range olefins for the FFA mixture. On the other hand, pre-hydrogenation of BG has an adverse effect on the product selectivities. The selectivity to olefins in the diesel range is about 80% higher and the selectivity to n-paraffins in the diesel range is 35% lower for pre-hydrogenated BG conversion than that of the pre-hydrogenated FFA mixture. These results suggest that the decarboxylation reaction sites of the Pd/C catalyst might be partially poisoned by impurities in BG.

The effect of pre-treatment of brown grease with $H_2$ on decarboxylation activity is investigated at 300° C. and 1.5 MPa in a batch mode reaction. FIGS. 15A and 15B show the effect of $H_2$-treatment of BG on FFA conversion and product selectivities. Although pre-hydrogenation of BG improves the FFA conversion after 6 hours, it retards the decarboxylation activity by the second hour of the reaction. This observation can be attributed to the production of a more stable form of FFAs (saturated FFAs of C16 and C18) after pre-treating brown grease with $H_2$. At zero time of the reaction, mainly mono-unsaturated FFAs are present for non-pretreated BG while only saturated FFAs exist for pretreated BG. Since saturated compounds are more stable than unsaturated compounds, pretreated BG shows a lower conversion trend at the beginning of the reaction. The non-pretreated BG batch reaction results are different than the semi-batch study where a continuous $H_2$ flow is operated. In terms of product selectivities, the n-paraffin (n-C13-n-C18) selectivity is almost the same with and without $H_2$ pretreatment of BG at 6 hours (FIG. 15B). However, the pre-hydrogenation step helps to decrease higher compound (C25+) selectivity and to increase unsaturated C13-C18 selectivity. GC-MS and GC-FID results confirm the formation of C9:0 and C15:0 FFAs for non-pretreated BG and the formation of C11:0, C13:0 and C15:0 FFAs and C6-C11 HCs for $H_2$— pretreated BG at 2 hours. Formation of C9:0 and C15:0 for non-pretreated BG can be explained by the cleavage of double bonds located at cis-9 for oleic and cis, cis, cis-9, 12, 15 for linolenic acids. Since C=C bonds are saturated in $H_2$— pretreated BG, such cleavage is not observed; instead, other FFAs form via cleavage of C—C bonds. This suggests that $H_2$— pretreatment avoids C=C bond cleavage, but not C—C cleavage. $H_2$-pretreatment of BG improves the diesel selectivity (a combined selectivity of saturated and unsaturated hydrocarbons in diesel range increases to 100%) and formation of heavy hydrocarbons are eliminated ($S_{C25+}$ decreased from 23.4% to 0%)).

Effect of $H_2$/BG Ratio: In order to further investigate the limiting effect in decarboxylation activity, $H_2$ partial pressure is increased about 4 times (initial $H_2$/BG ratio: about 0.3/1 mol/mol) so that a stoichiometric $H_2$ amount is supplied to saturate C=C bonds in the unsaturated FFA compounds of brown grease in the batch reactor. In this case, series reactions of partial hydrogenation of C=C double bonds and decarboxylation reactions are expected in a one stage reaction.

The stoichiometric $H_2$ amount is calculated based on the fact that 1 mol $H_2$ is required per mol of C=C. Therefore, one, two and three moles of $H_2$ are required per mole of oleic, linoleic and linolenic acids, respectively. Based on this calculation, an approximately 1/1 (mol/mol) $H_2$/BG ratio is considered as stoichiometric.

FIG. 16A displays the FFA conversion and product selectivities as a function of $H_2$/BG ratios (0.3/1, 1/1, 2/1 and 3/1) after 6 hours of reaction. Having a $H_2$/BG ratio of 1/1 mol/mol in the reaction atmosphere improves the FFA conversion by 40% compared with the case where a 0.3/1 ratio of $H_2$/BG is used. Increasing the $H_2$ amount to 2/1 ratio of $H_2$/BG further increased the FFA conversion by 1.3-fold. Interestingly, further increase to 3/1 ratio of $H_2$/BG does not have a noticeable effect on conversion. FIG. 16A also shows that using a stoichiometric $H_2$ amount leads to a 75% reduction in olefinic hydrocarbon product formation compared with using a 0.3/1 ratio of $H_6A$/BG. Moreover, a high $H_2$/BG ratio leads to a total elimination in olefin formation when the H6A/BG ratio is increased from 0.3/1 to 3/1 (Olefin selectivity decreases in the order: 0.3/1>1/1=2/1>3/1). There is a slight increase in C—C cracking selectivity under excess $H_2$ conditions (from 2/1 to 3/1 ratio of $H_2$/BG) while a significant increase is observed for the stoichiometric condition. An important observation is that the pre-hydrotreated BG decarboxylation (FIG. 16A) has the same FFA conversion level as that of the decarboxylation of non-prehydrotreated BG under stoichiometric $H_2$ conditions (FIG. 16A). However, based on the product selectivities, the most significant difference is the dominant reactions for these two different conditions. While decarboxylation and decarbonylation reactions are the major pathways for pre-hydrotreated BG conversion, decarboxylation and dimerization (high C25+ selectivity) are the major pathways for conversion of non-pretreated BG under a stoichiometric $H_2$ amount.

For the $H_2$/BG range in which the reactions are conducted, lower partial pressures of $H_2$ do not necessarily favor decarboxylation. As FIG. 5-b shows, HDO selectivity increases in the presence of excess $H_2$; while excess $H_2$ does not significantly affect the decarboxylation selectivity. Increasing the $H_2$ partial pressure causes a shift in the reaction pathway to decarbonylation because of the inhibition effect of $H_2$ and CO on decarboxylation activity. However, inhibition of the decarboxylation pathway with increasing $H_2$ partial pressure is not observed in this work. In contrast, decarbonylation/dehydrogenation selectivity significantly decreased from 23.4% to 0% by increasing H2/BG ratio from 0.3/1 to 3/1 (selectivity decreased in the order of 0.3/1>1/1=2/1>3/1) (FIG. 16B). Theoretically, $H_2$ partial pressure should not affect the decarbonylation and decarboxylation activities because of the reaction stoichiometry. However, the effect of $H_2$ on the conversion of carboxylic acids on Pd surface cannot be excluded in a lean $H_2$ environment due to the dehydrogenation of paraffins. On the other hand, in a rich $H_2$ environment, it is likely that olefins produced via decarbonylation of FFAs are further hydrogenated to n-paraffins. These n-paraffins can also be perceived as decarboxylation products. The use of $H_2$ is can detach the product hydrocarbons from the Pd surface. A low $H_2$/BG ratio gives the best green diesel selectivity (a combined selectivity of saturated and unsaturated C13-C18 hydrocarbons). However, the conversion is 58% lower than under the excess $H_2$ condition.

5% Pd/C catalyst is highly active for the decarboxylation of pure FFAs. Lower activity for BG conversion can be attributed to unidentified impurities. Solvent dilution as high as 90% is used to suppress side reactions and increase diesel yield. Pre-hydrotreated BG results in a 37% increase of conversion with 100% green diesel selectivity. Therefore, such a two-step processing with selective hydrogenation prior to the decarboxylation of BG improves the product selectivity. The decarboxylation process is a promising alternative to the high temperature and high pressure hydrodeoxygenation of waste oil conversion to diesel fuel.

A variety of catalysts and supports are studied for decarboxylation of oleic acid to produce diesel range hydrocarbons in super-critical water. NaOH and Ca(OH)$_2$ alkali metal salts tend to form complexes with oleic acid and hinder the oleic acid decarboxylation. Although NiMo/Al$_2$O$_3$ metal oxide catalyst shows significant initial decarboxylation activity, change of structure in water presents a challenge in the hydrothermal conversion processes. A Si—C support seems to be more effective than activated carbon itself for both decarboxylation of oleic acid and hydrogenation of alkenes in super-critical water. A systematic study of Pd loading on Si—C support shows that higher Pd loading leads to higher conversion, however, the lowest oxygenated products and highest diesel hydrocarbons yields are obtained on 3% Pd/Si—C. In order to reduce the amount of Pd in the catalyst, Pd$_2$Co/C catalysts with various Pd content are prepared and the catalytic activity study shows that 0.5 wt % Pd$_2$Co/C catalyst performs better than a 7 wt % Pd/C catalyst. Pd and Co metals are very well dispersed and formed fine clusters, which leads to a higher active metal surface area and hence favored the decarboxylation of oleic acid. The reduction temperature is found to be an important factor to control metal particle size.

The following chemicals are used in another investigation: NaOH, Ca(OH)$_2$, MgO, γ-Al$_2$O$_3$, NiMo/Al$_2$O$_3$ (Haldor Topsoe), activated carbon (Charcoal Norit, Sigma-Aldrich), palladium(II) chloride (PdCl$_2$, ≥99.9%, Sigma-Aldrich), cobalt, ethylene glycol, oleic acid (technical grade 90%, Sigma-Aldrich, St. Louis, Mo.), ultra high purity grade hydrogen (H$_2$) and nitrogen (N$_2$) from Cryogenic Gases (Detroit, Mich.).

For Pd/Si—C catalyst preparation, activated carbon (C) is immersed in liquid tetraethyl orthosilicate (TEOS) with a mass ratio of 2.86 TEOS to C. The mixture is stirred vigorously for 2 hours at 120° C. Then, it is dried at 105° C. for 18 hours. In order to obtain about 1, about 3, about 5 and about 7 wt % (about 1-7% by weight) Pd on the support about 0.2, about 0.6, about 1.1 and and about 1.6 wt % PdCl$_2$ (about 0.2-1.6%) solution is mixed with about 20 g support at room temperature for 24 hours, respectively. Another useful range of palladium may be about 0.5% to about 10% by weight. After the catalyst is dried at 100° C. for 5 hours, the reduction is carried out under a flow of about 10 vol % H$_2$-90 vol % N$_2$ at 200° C. for 3 hours. Pd$_2$Co/C catalysts with about 0.5, about 1, about 3 about 5, and about 7 wt % Pd are prepared. Activated carbon is suspended in deionized (DI) water with a mass ratio of 40/1 C to DI water prior to mixing with 1.1 wt % PdCl$_2$ and 0.01 M CoCl$_2$ solutions. A 0.04 M NaOH solution is added until the pH of the mixture reaches to 11. As a mild reducing agent, ethylene glycol is added to the mixture with an excess molar ratio of ethylene glycol to metal. The mixture is stirred at 80° C. followed by stirring at room temperature for 12 hours. After drying at 100° C., catalysts are ished multiple times with DI water. Then, they are dried at 80° C. for 10 hours. Two different temperatures (200° C. and 300° C.) for heat treatment are conducted in a tube furnace under 120 mL/min gas flow of 10 vol % H$_2$ balanced with N$_2$ for 3 hours.

Material characterization: Powder X-ray diffraction (XRD) patterns are obtained on SmartLab Guidance and MDI Jade 8 by a Rigaku RU2000 (Rigaku Americas Corporation, TX) at a scan rate of 3°/min and a step size of 0.02° (40 kV, 44 mA). The Scherrer equation and Bragg's law are used to calculate the mean metal particle size, the lattice parameter and bond distance.

Scanning electron microscopy (SEM) is conducted using an FE-SEM microscope operating at 15.0 kV and X-ray Energy-Dispersive Spectrometer (EDS) are used for elemental spectra and mapping.

The catalytic hydrothermal conversion of oleic acid is investigated in 1.52 mL stainless steel batch reactors assembled from ⅜-inch Swagelok port connectors. For the activity test of each catalyst, 10 mg catalyst, 0.156 mmol oleic acid and 0.642 mL water are loaded in the reactors and the reactors are sealed in a glove box. Reactors are placed in a pre-heated furnace set at 400° C. Time required to reach isothermal conditions is 30 minutes for each reactor. After the reaction, the reactors are quenched in a water bath and the liquid product is analyzed.

Analysis Method: in order to identify the products, a GC-MS (Clarus 500 GC-MS, Perkin-Elmer) with a capillary wax Rtx-WAX column (length: 60 m, diameter: 0.25 mm, thickness of stationary phase 0.25 μm) is used. In order to quantify the liquid products, the product is diluted to 5 mL with heptane and the organic phase is analyzed using a Perkin Elmer Clarus 500 gas chromatograph (GC) equipped with a flame ionization detector (FID) and an Rtx-65 TG column (length: 30 m, internal diameter: 0.25 mm, phase film thickness: 0.10 μm). For fatty acids separation, the GC oven temperature is programmed as follows: 2 min hold at 80° C., 10° C./min ramp to 200° C., 5 min hold at 200° C., 10° C./min ramp to 260° C., 3 min hold at 260° C. The detector temperature is maintained at 370° C. Samples (1 μL) are injected into the column with a 10:1 split ratio. For hydrocarbons analysis, the GC oven temperature is programmed as follows: 2 min hold at 40° C., 10° C./min ramp to 300° C., 5 min hold at 300° C. The injector and detector temperatures are 250° C. and 300° C., respectively, and the split ratio is 5:1. Concentrations are determined by external standard method. The molar yield is calculated from the following formula: Molar yield (%)=(No. of moles of product)/(Initial no. of moles of oleic acid)×100

In order to understand the effect of catalyst on the oleic acid conversion, the hydrothermal reaction of oleic acid in super-critical water is conducted both in the absence and presence of the catalyst. As shown in Table 6, without the catalyst, oleic acid conversion is only 4% at 5 hour. Decomposition products are mainly heavy molecules (C>25) and n-alkane 105 molar yield is 14.7%. Acetic acid ($CH_3COOH$) and stearic acid ($C_{17}H_{35}COOH$) are stabilized in supercritical water with negligible conversion.

TABLE 6

Oleic acid 5 hours reaction

| Catalyst | Conversion | Molar Yield (%) | | | | | OLP Yield (wt %) |
|---|---|---|---|---|---|---|---|
| | | n-alkanes (C10-C18) | Alkenes (C17-C18) | C17 aromatics | C8-C13 aromatics | Oxygenated products | |
| — | 4 | 14.7 | 0 | 0 | 0 | 96.5 | 108 |
| NaOH | 85 | 6.6 | 11.4 | 5.7 | 0.1 | 38.0 | 53 |
| Ca(OH)$_2$ | 92 | 6.8 | 6.6 | 0 | 2.7 | 52.5 | 54 |
| MgO | 97 | 4.8 | 8.0 | 2.8 | 5.4 | 10.4 | 19 |
| γ-Al$_2$O$_3$—NaOH | 93 | 2.8 | 11.6 | 5.9 | 0.5 | 6.3 | 11 |
| NiMo/Al$_2$O$_3$ | 81 | 30.7 | 41.4 | 0.2 | 0 | 23.0 | 86 |
| NiWC/Al-SBA-15 | 76 | 21.2 | 24.1 | 0 | 0.5 | 31.6 | 92 |
| Activated Carbon | 90 | 33.3 | 16.3 | 6.2 | 7.9 | 17.1 | 65 |
| Pd/C | 99 | 36.6 | 15.4 | 6.7 | 5.2 | 0.44 | 49 |

Effect of Anion/Salt on Oleic Acid Conversion: the decarboxylation of acetic acid derivatives in sub-critical water is enhanced by adding NaOH. It is believed that the sodium salts of these acids which form anionic carboxylic acids in water are more reactive than the corresponding non-ionic carboxylic acids. In this study, the effect of oleic acid anion in super-critical water on the product yield and selectivity is investigated by using a strong and a medium strength base, NaOH and Ca(OH)$_2$, respectively.

It is seen in Table 6 that oleic acid is not stable when NaOH and Ca(OH)$_2$ are added in the super-critical water. Although deoxygenated hydrocarbons yield is higher in NaOH containing super-critical water than in that of Ca(OH)$_2$, in both cases the organic liquid product (OLP) yield is about 50%. Although GC-FID analysis shows 85% oleic acid conversion in NaOH and 92% in Ca(OH)$_2$, after separating the organic and aqueous phases, white solid formation is observed. Observation of these solid materials suggested that the remaining portion of oleic acid might form complexes with NaOH and Ca(OH)$_2$. This may explain why the OLP yield is very low. When Ca(OH)$_2$ is used, no heavy molecule (>C$_{25}$) formation is observed and the main products are shorter chain fatty acids such as C$_{10}$, C$_{11}$, C$_{13}$, C$_{14}$, C$_{15}$, C$_{16}$ and C$_{17}$ fatty acids. This suggests that for Ca(OH)$_2$ there is a high selectivity towards hydrocracking with minimal decarboxylation activity.

Effect of Oxide Support on Oleic Acid Conversion: with MgO catalyst, no shorter chain fatty acids are formed, but solid product formation is observed as in the reactions with NaOH and Ca(OH)$_2$ catalysts. The solid is clearly phase separated at the interface of water and organic phase while some MgO settles on the bottom of the tube. Also the OLP yield for this experiment is only 19%. This suggests that a significant amount of products that are not soluble in heptanes are generated during the reaction, and are not included in GC-FID analysis. Moreover, GC-FID analysis revealed 97% oleic acid conversion while the n-alkanes molar yield is only 4.8%. This result supports the claim that oleic acid and MgO undergo saponification reaction as shown in Eq. (IV).

MgO and oleic acid saponification is observed at 400° C. This might be attributed to water free environment on hydrotalcite (MgO—Al$_2$O$_3$) catalyst. On the other hand, the hydration of MgO in the presence of water is well-known, and the formation of Mg(OH)$_2$ may explain why the oleic acid hydrothermal conversion results are similar to those of other hydroxide salts (NaOH and Ca(OH)$_2$) used in this study (Eq. V).

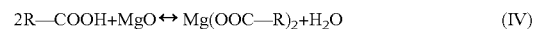

$$2R\text{—}COOH + MgO \leftrightarrow Mg(OOC\text{—}R)_2 + H_2O \quad (IV)$$

$$MgO + H_2O \rightarrow Mg(OH)_2 \quad (V)$$

It is known that few transition metals react with sodium hydroxide and generate H$_2$. Using NaOH:γ-Al$_2$O$_3$ (1.5:1 molar ratio) as catalyst for the hydrothermal conversion of oleic acid in super-critical water, NaOH is available to react with the surface hydroxyl groups to form Al—O—Na. In this step, H$_2$ necessary to saturate C═C double bonds of oleic acid can be generated according to the Eq. VI while alumina can act as a deoxygenation catalyst. Due to the presence of alumina, NaOH is not expected to take part in the oleic acid reaction but only attack to alumina. However, product selectivity shows even lower n-alkane yield (2.8%) than the reaction with NaOH alone in super-critical water. Also, the OLP yield is only 11%, indicating that water-soluble products, which is phase separated from the organic phase that is injected to GC, formed during this reaction. Having observed a white color water phase after the reaction is a hint of alcohol formation. It is possible that the Al—O—Na structure can catalyze deoxygenation of oleic acid as well as alcohol formation. Thus, the deoxygenation active sites of aluminum oxide catalyst may be deactivated by doping with NaOH.

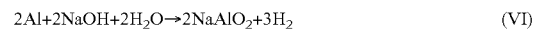

$$2Al + 2NaOH + 2H_2O \rightarrow 2NaAlO_2 + 3H_2 \quad (VI)$$

A conventional hydrotreating catalyst, Ni—Mo/Al$_2$O$_3$, is also tested for oleic acid decarboxylation activity in super-critical water. Although the oleic acid conversion is lower compared to the reactions with hydroxide salts, MgO and Al$_2$O$_3$—NaOH, both n-alkane and alkenes yields are greatly improved. While high yield to C17-C18 alkenes (41.4%) shows that Ni—Mo/Al$_2$O$_3$ catalyst has active sites responsible for deoxygenation of fatty acid, high yield of n-alkanes (30.7%) and formation of stearic acid indicate that the catalyst also possesses a C═C double bond hydrogenation function. In addition, the OLP yield is 86% in this experiment. Considering the oxygen removal in the gas phase, the organic liquid yield must be about 85 wt % for 100% conversion, which shows that the OLP yield from this experiment is conswastent with the theoretical value. The 5-hour hydrothermal reaction of oleic acid in the presence of NiMo/Al$_2$O$_3$ catalyst shows that this conventional and inexpensive catalyst can be considered as an option to produce green diesel without H$_2$ addition. However, one should consider the stability of Ni—Mo/Al$_2$O$_3$ catalyst in super-critical water and should alter the catalyst to avoid the undesirable structure change of the support from γ-Al$_2$O$_3$ to boehmite (γ-AlO(OH)).

Effect of Carbide Catalyst on Oleic Acid Conversion: when NiWC/Al-SBA-15 catalyst is used, both deoxygenation and hydrogenation activities, similar to Ni—Mo/Al$_2$O$_3$ are observed (Table 6). Moreover, formation of C9 fatty acid (molar yield of 3.3%) shows that the carbide catalyst has some cracking activity. However, the conversion and hydrocarbon yield are significantly lower than those obtained with NiMo/γ-Al$_2$O$_3$ catalyst. Although, Al-SBA-15 supported catalyst exhibited a lower fatty acid conversion and a lower yield to deoxygenated products, it is believed to possess a higher hydrothermal stability than the conventional hydrotreating catalyst supports.145 Therefore, Al-109 SBA-15 can be considered as a promising stable support in super-critical water as an alternative to γ-Al$_2$O$_3$ supported catalyst.

When activated carbon is used in the oleic acid hydrothermal conversion, the yield to n-alkenes is lower but the yield to n-alkanes is higher compared to carbide and oxide catalysts (Table 6). This shows that activated carbon has a higher activity for C═C double bond hydrogenation in addition to a higher activity for fatty acid deoxygenation (oxygenated product molar yield of 17.1%) than those obtained with carbide and oxide catalysts. On the other hand, a lower mass balance (65%) is observed when activated carbon is used. A low mass balance (75%) for unsaturated fatty acids hydrothermal conversion on an activated carbon supported catalyst is attributed to the possible formation of high molecular weight compounds that cannot be detected from GC analysis.

When activated carbon supported palladium catalyst is used, the oleic acid conversion is already 99% after 1 hour (Table 6). Although the deoxygenation activity is very high (oxygenated product molar yield of 0.44) on Pd/C catalyst, the OLP yield is only 49%.

Table 7 shows the results from 5 hours oleic acid reactions in super-critical water over Si—C supported palladium with various metal loadings. Compared to the activated carbon discussed in the previous section, Si—C support shows higher yield to oleic acid deoxygenation products (37.8% yield to alkenes) in addition to higher hydrogenation activity (42.4% yield to n-alkanes). No aromatics between C8-C13 form with Si—C support. Table 8 represents the 1 hour data for the same set of catalyst. At 65% conversion, having alkene yields higher than the n-alkane yields for 0 and 1% Pd/Si—C indicates the direct decarboxylation of oleic acid. Possibly these alkenes are further hydrogenated to n-alkanes and cracked to obtain n-alkanes in the C10-C18 range. However, the same conclusion cannot be drawn for 3, 5 and 7% Pd/Si—C catalysts because the oleic acid conversion on these catalysts is already more than 80% after 1 hour reaction. It is seen that the n-alkane, alkene and C17 aromatics yields increased as conversion increased for 0, 1 and 7% Pd loaded catalysts as the reaction proceeds from 1 to 5 hours. On the other hand, 3 and 5% Pd/Si—C catalysts follow a different route. Although oxygenated products yield significantly decreased between 1 and 5 hours, n-alkene yields decreased for 3 and 5% Pd/Si—C catalysts. For these two catalysts, C8-C13 aromatics formation and the alkenes yield decrease while deoxygenation increases at 5 hours, which indicates that the alkenes are further reacted to form shorter chain aromatics. These two catalysts clearly promoted the aromatization reaction.

5% Pd/C is an effective catalyst for aromatics production from alkanes selectively towards alkylbenzenes at 400° C. Overall 3% Pd/Si—C shows the best performance due to the low oxygenated product yield and its total hydrocarbon yield is comparable to that obtained on 7% Pd/Si—C catalyst.

TABLE 7

Different Pd loading on Si—C, 5 hours reaction Pd wt % on Si

| Pd wt % on Si-catalyst | Conversion | Molar Yield (%) | | | | | OLP Yield (wt %) |
| --- | --- | --- | --- | --- | --- | --- | --- |
| | | n-alkanes (C10-C18) | Alkenes (C17-C18) | C17 aromatics | C8-C13 aromatics | Oxygenated products | |
| 0 | 92 | 42.4 | 37.8 | 9.1 | 0 | 13.0 | 90 |
| 1 | 98 | 49.1 | 37.5 | 9.4 | 0.3 | 8.6 | 88 |
| 3 | 100 | 42.8 | 20.7 | 8.4 | 7.1 | 4.9 | 66 |
| 5 | 100 | 39.5 | 19.9 | 8.0 | 7.5 | 3.0 | 60 |
| 7 | 100 | 56.6 | 33.3 | 12.5 | 0.1 | 5.2 | 95 |

TABLE 8

Different Pd loading on Si—C, 1 hour reaction Pd wt % on Si—C

| Pd wt % on Si-catalyst | Conversion | Molar Yield (%) | | | | | OLP Yield (wt %) |
| --- | --- | --- | --- | --- | --- | --- | --- |
| | | n-alkanes (C10-C18) | Alkenes (C17-C18) | C17 aromatics | C8-C13 aromatics | Oxygenated products | |
| 0 | 65 | 16.8 | 24.9 | 6.1 | 0 | 45.8 | 94 |
| 1 | 65 | 19.3 | 25.8 | 6.6 | 0 | 42.4 | 90 |

TABLE 8-continued

Different Pd loading on Si—C, 1 hour reaction Pd wt % on Si—C

| Pd wt % on Si-catalyst | Conversion | Molar Yield (%) | | | | | OLP Yield (wt %) |
| --- | --- | --- | --- | --- | --- | --- | --- |
| | | n-alkanes (C10-C18) | Alkenes (C17-C18) | C17 aromatics | C8-C13 aromatics | Oxygenated products | |
| 3 | 89 | 40.3 | 26.0 | 10.2 | 0.1 | 17.3 | 82 |
| 5 | 84 | 42.0 | 30.7 | 9.6 | 0.2 | 28.7 | 99 |
| 7 | 92 | 45.5 | 27.8 | 10.6 | 0 | 20.6 | 92 |

Table 9 shows the n-alkane distribution in the organic liquid product at 1 hour. For all the catalysts, n-C17 is the main n-alkane, indicating the main reactions are decarboxylation of oleic acid followed by hydrogenation to n-heptadecane. Not all the alkenes are hydrogenated under the reaction conditions (Table 7 and Table 8). In addition, the about 3, about 5 and about 7% Pd containing catalysts possess cracking activity which is drawn from formation of shorter chain n-alkanes. On the other hand, the oleic acid used in the experiments contains C16 fatty acid as an impurity (up to 10%). The n-C15 and n-C16 alkanes are the decarboxylation and hydrodeoxygenation products of C16 fatty acid for 0 and 1% Pd catalysts.

TABLE 9 n-alkane product distribution on Pd supported Si—C Catalyst, 1 hr

| Pd wt % on Si-catalyst | Molar Yield (%) | | | | | | | | |
| --- | --- | --- | --- | --- | --- | --- | --- | --- | --- |
| | n-C10 | n-C11 | n-C12 | n-C13 | n-C14 | n-C15 | n-C16 | n-C17 | n-C18 |
| 0 | 0 | 0 | 0 | 0 | 0 | 1.8 | 4.1 | 6.7 | 4.2 |
| 1 | 0 | 0 | 0.6 | 0 | 0 | 1.2 | 4.4 | 8.9 | 4.3 |
| 3 | 1.2 | 0.7 | 0.8 | 0.5 | 0.5 | 3.0 | 7.6 | 21.8 | 4.0 |
| 5 | 0.9 | 0.5 | 0.8 | 0 | 0.6 | 2.1 | 7.3 | 25.5 | 4.3 |
| 7 | 0.7 | 0.6 | 0.8 | 0 | 0.6 | 3.7 | 8.4 | 26.3 | 4.4 |

Pd—Co Alloy on Activated Carbon: oleic acid conversion and the liquid product yields, obtained with various Pd loaded Pd$_2$Co alloys on activated carbon after 1 hour in super-critical water, are given in Table 10. 5% Pd on activated carbon is also shown as a comparison. Conversion for each catalyst is more than 89% after 1 hour reaction. Even the low metal loaded Pd$_2$Co alloy catalysts shows better performance in terms of both conversion and hydrocarbon yield compared with only Pd on activated carbon or Si—C. When the Pd loading is 5% in the Pd$_2$Co/C catalyst, decarboxylation (alkenes) yield only slightly increased compared to Pd only on carbon. For these two catalysts, a lower reduction temperature shows a slight improvement on the catalytic activity. 3% Pd$_2$Co/C-200 catalyst surprisingly shows the highest yield to oxygenated products and lowest yield to hydrocarbons.

3% Pd/Si—C shows high deoxygenation activity which is different than 3% Pd in Pd$_2$Co/C-200. The morphology obtained by XRD (Table 6) shows that average metal particle size is smaller on Pd/Si—C than Pd$_2$Co/C. The larger metal particle formation can be attributed to alloy formation. For 5% Pd/C the Pd(111) phase appeared at 2θ=39.8° while it shifted to 40.1° for 5% Pd$_2$Co/C-300, 5% Pd$_2$Co/C-200 and 3% Pd$_2$Co/C-300, and to 40.0° for 3% Pd$_2$Co/C-200 catalysts.

TABLE 10

Different Pd loading in Pd$_2$Co alloy supported on C, 1 hour reaction Pd2Co/C-x

| Pd$_2$Co/C-x (Pd wt %) | Conversion | Molar Yield (%) | | | | | OLP Yield (wt %) |
| --- | --- | --- | --- | --- | --- | --- | --- |
| | | n-alkanes (C10-C18) | Alkenes (C17-C18) | C17 aromatics | C8-C13 aromatics | Oxygenated products | |
| 0.5% Pd$_2$Co/C-200 | 93 | 51.7 | 43.1 | 12.5 | 0.1 | 10.1 | 102 |
| 0.5% Pd$_2$Co/C-300 | 100 | 31.8 | 26.2 | 8.4 | 0 | 16.3 | 73 |
| 1.0% Pd$_2$Co/C-200 | 89 | 44.4 | 38.5 | 11.6 | 0.1 | 18.1 | 100 |
| 1.0% Pd$_2$Co/C-300 | 99 | 38.0 | 30.7 | 10.6 | 0.7 | 8.2 | 75 |
| 3.0% Pd$_2$Co/C-200 | 93 | 29.8 | 25.4 | 8.6 | 0.6 | 34.3 | 88 |
| 3.0% Pd$_2$Co/C-300 | 93 | 31.1 | 28.1 | 8.6 | 0 | 19.1 | 77 |

TABLE 10-continued

Different Pd loading in Pd₂Co alloy supported on C, 1 hour reaction Pd2Co/C-x

| Pd₂Co/C-x (Pd wt %) | Conversion | Molar Yield (%) | | | | | OLP Yield (wt %) |
| --- | --- | --- | --- | --- | --- | --- | --- |
| | | n-alkanes (C10-C18) | Alkenes (C17-C18) | C17 aromatics | C8-C13 aromatics | Oxygenated products | |
| 5.0% Pd₂Co/C-200 | 92 | 39.0 | 32.8 | 10.1 | 0.5 | 18.5 | 86 |
| 5.0% Pd₂Co/C-300 | 94 | 31.7 | 26.8 | 8.9 | 2.3 | 16.3 | 74 |
| 5.0% Pd/C | 89 | 41.4 | 26.3 | 11.0 | 0.2 | 21.1 | 88 | x = Reduction temperature (° C.)

The atomic ratios of Pd and Co metals in the catalysts that are reduced at 300° C. are shown in Table 11. These values are calculated by EDAX, and the values shown in parenthesis represent the actual atomic ratios. For the catalysts 1% Pd₂Co/C and 5% Pd₂Co/C-300, EDAX results are fairly close to the actual atomic ratio of 68% Pd-32% Co. This means the metal particles are well distributed. However, EDAX shows almost 50% Pd-50% Co for 0.5% Pd₂Co/C-300 and 3% Pd₂Co/C-300 catalysts. This suggests possible segregation of Pd and Co particles on the carbon support for these 2 different metal loadings. On the other hand, SEM images and the metal mapping (FIG. 18) show that none of the catalysts have metal aggregation. The SEM images and metal particle mapping of samples Pd₂Co/C-200 with various Pd loading: 0.5% (18A), 1% (18B), 3% (18C) and 5% (18D) Co/Pd.

TABLE 11

Atomic ratios of Pd and Co metals in Pd₂Co/C-300 catalysts

| | At %* | | | |
| --- | --- | --- | --- | --- |
| Element | 0.5% Pd₂Co/C-300 | 1% Pd₂Co/C-300 | 3% Pd₂Co/C-300 | 5% Pd₂Co/C-300 |
| PdL | 47.30 (69%) | 60.37 (68%) | 48.56 (68%) | 71.04 (68%) |
| CoK | 52.70 (31%) | 39.63 (32%) | 51.44 (32%) | 28.96 32%) |

*= Atomic % of metals are calculated by EDAX
At % shown in parenthesis are the actual values 0.5% Pd₂Co/C-200 catalyst shows the best performance with low oxygenated product molar yield (10%), and with significantly high n-alkane, alkene and aromatic yields (Table 10). The XRD pattern does not show any Pd or Co metal phases. One possibility is that the Pd (0.5 wt %) and Co (0.1 wt %) metal concentrations are lower than the detection limit for XRD. Another possibility is that the Pd and Co metals are very well dispersed small clusters which agrees with the SEM images (FIG. 18A-B). With the exception of the 3% Pd₂Co/C-200 catalyst, all the catalysts that are reduced at 200° C. shows better decarboxylation (alkene product) yield in comparison with the same metal loading containing catalysts that are reduced at 300° C. (Table 10). This can be attributed to the smaller particle size at lower heat treatment (Table 12). Smaller particle size leads to a higher active metal site surface area which may be responsible for high decarboxylation activity.

Pd—Pd bond distance (Table 12) and the decarboxylation performance of the catalysts (Table 10) are in good agreement. While 3% Pd₂Co/C-300, 5% Pd₂Co/C-200 and 5% Pd₂Co/C-300 all have similar bond distance and show similar decarboxylation activity, the 3% Pd₂Co/C-200 catalyst shows a higher bond distance which can be related with its lower decarboxylation activity.

TABLE 12

Metal particle size calculated from XRD diffractions

| Pd₂Co/C-x | Particle size, dp (nm) | Lattice parameter, a (nm) | Pd—Pd bond distance (nm) |
| --- | --- | --- | --- |
| 0.5% Pd₂Co/C-200 | n.d. | n.d. | n.d. |
| 0.5% Pd₂Co/C-300 | n.d. | n.d. | n.d. |
| 1.0% Pd₂Co/C-200 | n.d. | n.d. | n.d. |
| 1.0% Pd₂Co/C-300 | n.d. | n.d. | n.d. |
| 3.0% Pd₂Co/C-200 | 6.0 | 2.6001 | 2.2518 |
| 3.0% Pd₂Co/C-300 | 7.8 | 2.5951 | 2.2475 |
| 5.0% Pd₂Co/C-200 | 6.5 | 2.5959 | 2.2477 |
| 5.0% Pd₂Co/C-300 | 7.3 | 2.5956 | 2.2479 |
| 5.0% Pd/C | 4.1 | 2.6119 | 2.2619 |

Both activated carbon and Si—C supports are active for oleic acid hydrothermal decarboxylation in super-critical water. These supports become more active after Pd loading. A 0.5 wt % Pd₂Co/C catalyst shows even higher hydrocarbon yield than a 7 wt % Pd/C catalyst. The reason for the significantly high selective decarboxylation being promoted on PdCo alloy catalyst with a low Pd content is attributed to the well dispersed Pd and Co metal cluster formation, which leads to a higher active metal surface are. The reduction in temperature assists in forming smaller metal particle size. An alloy of Pd on carbon with a low Pd content can be more active and selective to diesel hydrocarbons production from an unsaturated fatty acid in super-critical water. Thus, Pd—C alloy on carbon may be regarded as a prospective feasible decarboxylation catalyst for the removal of oxygen from vegetable oil/animal fat without the need of additional $H_2$.

As a person skilled in the art will readily appreciate, the above description is meant as an illustration of implementation of the principles this application. This description is not intended to limit the scope of this application in that the system is susceptible to modification, variation and change, without departing from the spirit of this application, as defined in the following claims.

What is claimed is:

1. A catalyst for decarboxylation of a fatty acid, the catalyst comprising:
    about 0.5% to about 10% palladium by weight; and
    a support comprising silicon atoms and carbon atoms, a ratio of carbon atoms to silicon atoms of the support being about 3:1 to about 40:1.

2. The catalyst according to claim 1, wherein the ratio of carbon atoms to silicon atoms is about 4.3:1 to about 34.7:1.

3. The catalyst according to claim 2 wherein the ratio of carbon atoms to silicon atoms is about 4.3:1.

4. The catalyst according to claim 1 having a porous surface with an average pore diameter of about 3.6 nanometers to about 5.4 nanometers.

5. The catalyst according to claim 1 comprising about 5% palladium by weight.

6. The catalyst according to claim 1 wherein the palladium comprises a metal particle having a diameter of about 3 nanometers to about 8 nanometers.

7. The catalyst according to claim 1 wherein the catalyst has an acidity of about 0.10 to about 2.5 mmol/gcat.

8. The catalyst according to claim 1 wherein when exposed to oleic acid, the catalyst converts at least 10% of the oleic acid to n-heptadecane.

9. The catalyst according to claim 8 which converts at least 30% of the oleic acid to n-heptadecane.

10. A method of making a catalyst for decarboxylation of a fatty acid, the method comprising:
  combining activated carbon with tetraethyl orthosilicate to form a support, a ratio of carbon atoms to silicon atoms of the support being about 3:1 to about 40:1;
  mixing a palladium solution with the support to result in the catalyst finally comprising about 0.5% to about 10% palladium by weight; and
  drying the catalyst.

11. The method of claim 10 wherein the tetraethyl orthosilicate is provided in a mass ratio to the activated carbon of about 0.5:1 to about 4:1.

12. The method of claim 11 wherein the mass ratio of tetraethyl orthosilicate to activated carbon is about 4:1.

13. The method of claim 10 wherein palladium comprises about 5% of a weight of the catalyst.

14. The method of claim 10 wherein the palladium solution is a solution of about 1.1% palladium chloride by weight and a weight ratio of palladium chloride to support is about 0.088:1.

15. The method of claim 10 wherein when the catalyst is exposed to oleic acid, it converts at least 10% of the oleic acid to n-heptadecane.

16. A method of converting brown grease to green diesel, the method comprising:
  diluting the brown grease with a diluent;
  combining brown grease with a catalyst comprising about 0.5% to about 10% palladium by weight on a support comprising silicon atoms and carbon atoms in a reactor having a gas flow intake and a gas relief valve, a ratio of carbon atoms to silicon atoms of the support being about 3:1 to about 40:1; and
  providing a volume of gas comprising hydrogen gas through the gas flow intake and allowing gas to exhaust through the gas relief valve to maintain a pressure of about 1.5 megapascal.

17. The method of claim 16 further comprising pretreating the brown grease with a catalyst comprising palladium and carbon under a flow of hydrogen gas.

18. The method of claim 17 wherein pretreating comprises about two hours at about one hundred degrees Celsius at a pressure of 1.5 megapascal.

19. The method of claim 16 wherein the catalyst is soaked with dodecane and reduced under a flow of hydrogen gas prior to combining with brown grease.

\* \* \* \* \*